United States Patent
Otomo et al.

(10) Patent No.: US 7,269,105 B2
(45) Date of Patent: Sep. 11, 2007

(54) DIGITAL AUDIO RECORDING MEDIUM AND REPRODUCING APPARATUS THEREOF

(75) Inventors: Hitoshi Otomo, Yokohama (JP); Hideki Mimura, Yokohama (JP); Junichi Uota, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 170 days.

(21) Appl. No.: 11/134,636

(22) Filed: May 23, 2005

(65) Prior Publication Data

US 2005/0270938 A1  Dec. 8, 2005

Related U.S. Application Data

(62) Division of application No. 10/372,149, filed on Feb. 25, 2003, now Pat. No. 7,050,370, which is a division of application No. 09/340,039, filed on Jun. 28, 1999, now Pat. No. 6,580,671.

(30) Foreign Application Priority Data

Jun. 26, 1998 (JP) .................................. 10-180319

(51) Int. Cl.
*G11B 5/09* (2006.01)

(52) U.S. Cl. ................. 369/47.15; 369/47.22; 369/59.21

(58) Field of Classification Search ................ 369/100, 369/47.15, 47.27, 124.07, 275.3, 59.21, 59.23, 369/59.27, 47.16, 47.19, 47.2, 59.22, 47.22; 375/355; 704/212, 500

See application file for complete search history.

(56) References Cited

U.S. PATENT DOCUMENTS

| 5,185,732 A | * | 2/1993 | Ogawa et al. | ............. 369/47.1 |
| 5,247,396 A | | 9/1993 | Nagai et al. | |
| 5,691,972 A | * | 11/1997 | Tsuga et al. | ............. 369/275.3 |
| 5,844,513 A | | 12/1998 | Nishio | |
| 5,896,358 A | * | 4/1999 | Endoh et al. | ............. 369/275.3 |

(Continued)

FOREIGN PATENT DOCUMENTS

EP          0 178 589          4/1986

(Continued)

OTHER PUBLICATIONS

Explanation of Circumstances concerning Accelerated Examination for Japanese Patent Application No. 10-180319 (w/English Translation).

(Continued)

*Primary Examiner*—Andrea Wellington
*Assistant Examiner*—Kim-Kwok Chu
(74) *Attorney, Agent, or Firm*—Oblon, Spivak, McClelland, Maier & Neustadt, P.C.

(57) ABSTRACT

A DVD audio data structure following high-sound-quality specifications is realized, making the best use of the audio data structure standard in DVD video. A first sample data string created by digitizing a first channel audio signal at a first sampling frequency in a first number of quantization bits, a second sample data string created by digitizing a second channel audio signal at a second sampling frequency in a second number of quantization bits, and header data including timing data to synchronize the first sample data string with the second sample data string are recorded on a recording medium.

5 Claims, 29 Drawing Sheets

U.S. PATENT DOCUMENTS

| | | |
|---|---|---|
| 6,160,953 A | 12/2000 | Fuchigami et al. |
| 6,173,022 B1 * | 1/2001 | McPherson et al. ........ 375/355 |
| 6,215,737 B1 * | 4/2001 | Thagard et al. ................ 369/4 |
| 6,226,446 B1 | 5/2001 | Murase et al. |
| 6,449,227 B1 | 9/2002 | Heo |
| 6,580,671 B1 * | 6/2003 | Otomo et al. ............ 369/47.15 |
| 6,665,241 B2 | 12/2003 | Heo |
| 6,798,981 B1 | 9/2004 | Yamauchi et al. |

FOREIGN PATENT DOCUMENTS

| | | |
|---|---|---|
| EP | 0 325 477 | 7/1989 |
| EP | 0 558 852 | 9/1993 |
| EP | 0 797 197 | 9/1997 |
| EP | 0 797 198 | 9/1997 |
| EP | 0 797 199 | 9/1997 |
| EP | 0 855 715 | 7/1998 |
| EP | 0 867 877 | 9/1998 |
| JP | 8-65072 | 3/1996 |
| JP | 9-214882 | 8/1997 |
| JP | 9-312066 | 12/1997 |
| JP | 10-64199 | 3/1998 |
| JP | 11-66754 | 3/1999 |

OTHER PUBLICATIONS

Explanation of Circumstances concerning Accelerated Examination for Japanese Patent Application No. 2002-67305 (w/English Translation).

* cited by examiner

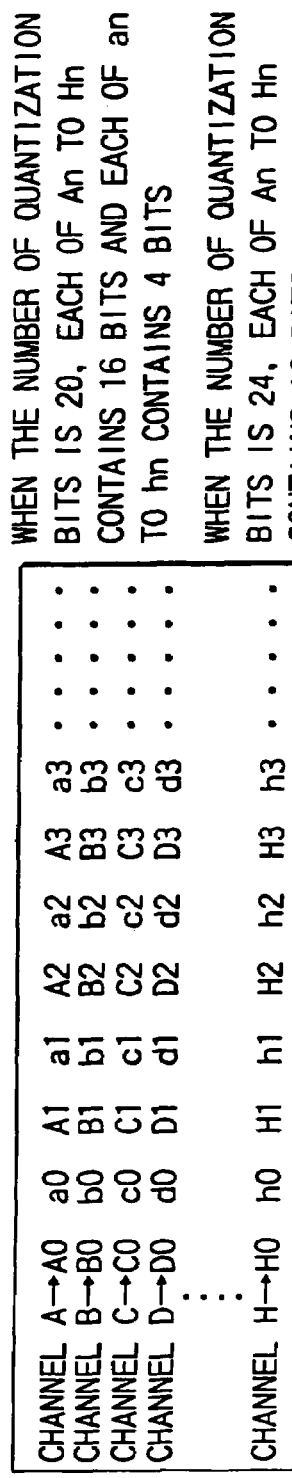
FIG.1A
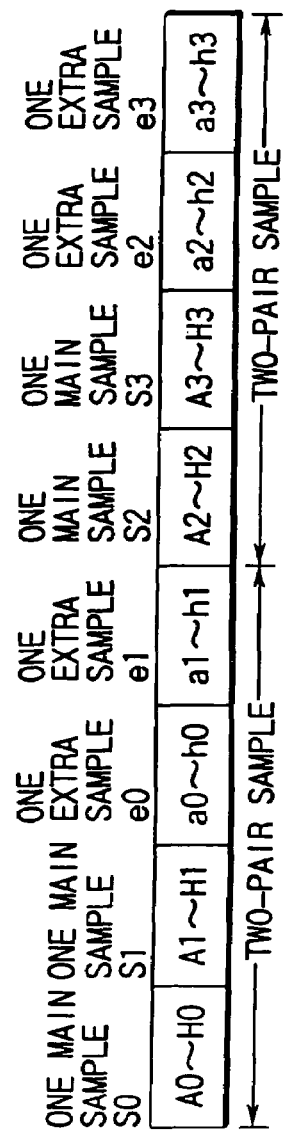
FIG.1B
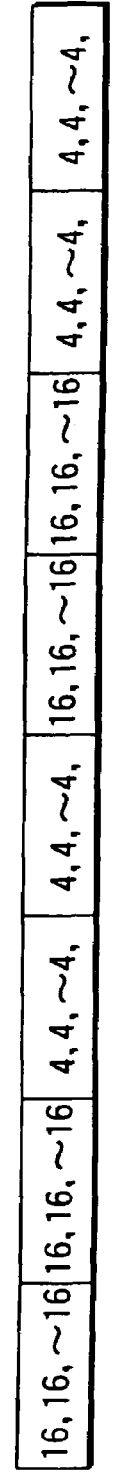
FIG.1C
FIG.1D

| STREAM MODE | | | DATA IN PACKET | | |
|---|---|---|---|---|---|
| NO. OF CHANNELS | fs (kHz) | NO. OF QUANTIZATION BITS (bits) | MAX. NO. OF SAMPLES IN PACK | DATA SIZE (bytes) | PACKET STUFFING FIRST/ THE OTHER (bytes) | PADDING PACKET FIRST/ THE OTHER (bytes) |
| 1 (MONO) | 48/96 | 16 | 1004 | 2008 | 2/5 | 0/0 |
| 1 (MONO) | 48/96 | 20 | 804 | 2010 | 0/3 | 0/0 |
| 1 (MONO) | 48/96 | 24 | 670 | 2010 | 0/3 | 0/0 |
| 2 (STEREO) | 48/96 | 16 | 502 | 2008 | 2/5 | 0/0 |
| 2 (STEREO) | 48/96 | 20 | 402 | 2010 | 0/3 | 0/0 |
| 2 (STEREO) | 48/96 | 24 | 334 | 2004 | 6/0 | 0/9 |
| 3 | 48/96 | 16 | 334 | 2004 | 6/0 | 0/9 |
| 3 | 48/96 | 20 | 268 | 2010 | 0/3 | 0/0 |
| 3 | 48 | 24 | 222 | 1998 | 0/0 | 12/15 |
| 4 | 48/96 | 16 | 250 | 2000 | 0/0 | 10/13 |
| 4 | 48 | 20 | 200 | 2000 | 0/0 | 10/13 |
| 4 | 48 | 24 | 166 | 1992 | 0/0 | 18/21 |
| 5 | 48 | 16 | 200 | 2000 | 0/0 | 10/13 |
| 5 | 48 | 20 | 160 | 2000 | 0/0 | 10/13 |
| 5 | 48 | 24 | 134 | 2010 | 0/3 | 0/0 |
| 6 | 48 | 16 | 166 | 1992 | 0/0 | 18/21 |
| 6 | 48 | 20 | 134 | 2010 | 0/3 | 0/0 |
| 7 | 48 | 16 | 142 | 1988 | 0/0 | 22/25 |
| 8 | 48 | 16 | 124 | 1984 | 0/0 | 26/29 |

FIG.6

| FIELD | NO. OF BITS | NO. OF BYTES | VALUE |
|---|---|---|---|
| Pack_start_code | 32 | 4 | 000001BAh |
| SCR | 48 | 6 | TO BE DECIDED BY CREATOR |
| Program_mux_rate | 24 | 3 | 10.08Mbps |
| Pack_stuffing_length | 8 | 1 | WHEN STUFFING IS ABSENT 000b |

FIG. 7

| FIELD | NO. OF BITS | NO. OF BYTES | VALUE | DESCRIPTION |
|---|---|---|---|---|
| packet_start_code_prefix | 24 | 3 | 000001h | |
| stream_id | 8 | 1 | 10111101b | PRIVATE STREAM 1 |
| PES_packet_length | 16 | 2 | | |
| PES INFORMATION | 24 | 3 | | |
| PTS | 40 | 5 | | |
| butter_size etc. | | 1 | | |
| | | 2 | | |
| stuffing_byte | | 0~7 | | |
| sub_stream_id | 8 | 1 | | |
| number_of_frame_heders | 8 | 3 | | |
| first_access_unit_pointer | 16 | | | |
| audio_emphasis_flag audio_mute_flag audio_frame_number quantization_word_lengh audio_sampling_frequency number_of_audio_channels dynamic_range_control | | 3 | | |
| AUDIO DATA | | | | |

FIG. 8

WHEN Art1:96 kHz, 16 bits Art2:48 kHz, 16 bits

| S4n,S4n+1(Atr1) | | S4n+2,S4n+3(Atr1) | | S2n,S2n+1(Atr2) | |
|---|---|---|---|---|---|
| S4n | S4n+1 | S4n+2 | S4n+3 | S2n | S2n+1 |

4 SAMPLES

6 SAMPLES

WHEN Art1:96 kHz, 24 bits Art2:96 kHz, 20 bits

| S2n, S2n+1 (Atr1) | | | | S2n, S2n+1 (Atr2) | | | |
|---|---|---|---|---|---|---|---|
| S2n | S2n+1 | e2n | e2n+1 | S2n | S2n+1 | e2n | e2n+1 |

4-PAIR SAMPLES

WHEN Art1:48 kHz, 16 bits Art2:48 kHz, 16 bits

WHEN Art1:96 kHz, 20 bits Art2:48 kHz, 24 bits

WHEN Art1:96 kHz, 16 bits Art2:48 kHz, 16 bits

AUDIO TITLE SET INFORMATION MANAGEMENT TABLE ATSI_MAT

| BYTE POSITION | SYMBOL | DESCRIPTION | NO. OF BYTES |
|---|---|---|---|
| 0—11 | ATS_ID | ATS IDENTIFIER | 12 |
| 12—15 | ATS_EA | ATS END ADDRESS | 4 |
| 16—27 | RESERVED | RESERVED | 12 |
| 28—31 | ATSI_EA | ATSI END ADDRESS | 4 |
| 32—33 | VERN | VERSION | 2 |
| 34—127 | RESERVED | RESERVED | 94 |
| 128—131 | ATSI_MAT_EA | END ADDRESS | 4 |
| 132—191 | RESERVED | RESERVED | 60 |
| 192—195 | VTS_SA | START ADDRESS | 4 |
| 196—199 | AOTT_AOBS_SA/ AOTT_VOBS_SA | START ADDRESS | 4 |
| 200—203 | RESERVED | RESERVED | 4 |
| 204—207 | ATS_PGCIT_SA | START ADDRESS | 4 |
| 208—255 | RESERVED | RESERVED | 48 |
| 256—383 | AOTT_AOB_ATR/ AOTT_VOB_ATR (#0~#7) | ATTRIBUTE OF AOB FOR AOTT OR ATTRIBUTE OF AUDIO STREAM OF VOB FOR AOTT | 128 |
| 384—671 | ATS_DM_COEFT (#0~#15) | MIXING COEFFICIENT FOR MULTICHANNEL→ 2 CHANNEL AUDIO DATA | 288 |
| 672—2047 | RESERVED | RESERVED | 1376 |
|  |  | TOTAL NO. OF BYTES | 2048 |

FIG. 24

| ALLOCATION PER CHANNEL | CONTENTS OF FIRST AND SECOND CHANNEL (CH) GROUPS, RELATIONSHIP BETWEEN AUDIO CHANNEL AND AUDIO SIGNAL | | | | | | NO. OF 1ST CHANNEL GROUPS | NO. OF 2ND CHANNEL GROUPS |
|---|---|---|---|---|---|---|---|---|
| | ACH0 | ACH1 | ACH2 | ACH3 | ACH4 | ACH5 | | |
| 00000b | C(mono) | NONE | NONE | NONE | NONE | NONE | 1 | 0 |
| 00001b | L | R | NONE | NONE | NONE | NONE | 2 | 0 |
| 00010b | Lf | Rf | S | NONE | NONE | NONE | 2 | 1 |
| 00011b | Lf | Rf | Ls | Rs | NONE | NONE | 2 | 2 |
| 00100b | Lf | Rf | LFE | NONE | NONE | NONE | 2 | 1 |
| 00101b | Lf | Rf | LFE | S | NONE | NONE | 2 | 2 |
| 00110b | Lf | Rf | LFE | Ls | Rs | NONE | 2 | 3 |
| 00111b | Lf | Rf | C | NONE | NONE | NONE | 2 | 1 |
| 01000b | Lf | Rf | C | S | NONE | NONE | 2 | 2 |
| 01001b | Lf | Rf | C | Ls | Rs | NONE | 2 | 3 |
| 01010b | Lf | Rf | C | LFE | NONE | NONE | 2 | 2 |
| 01011b | Lf | Rf | C | LFE | S | NONE | 2 | 3 |
| 01100b | Lf | Rf | C | LFE | Ls | Rs | 2 | 4 |
| 01101b | Lf | Rf | C | S | NONE | NONE | 2 | 1 |
| 01110b | Lf | Rf | C | Ls | Rs | NONE | 3 | 2 |
| 01111b | Lf | Rf | C | LFE | NONE | NONE | 3 | 1 |
| 10000b | Lf | Rf | C | LFE | S | NONE | 3 | 2 |
| 10001b | Lf | Rf | C | LFE | Ls | Rs | 3 | 3 |
| 10010b | Lf | Rf | Ls | Rs | LFE | NONE | 3 | 1 |
| 10011b | Lf | Rf | Ls | Rs | C | NONE | 4 | 1 |
| 10100b | Lf | Rf | Ls | Rs | C | LFE | 4 | 2 |
| OTHERS | | | | | | | | |

FIRST CHANNEL GROUP ← | → SECOND CHANNEL GROUP

FIG. 26

| FIELD | NO. OF BITS | NO. OF BYTES | VALUE | DESCRIPTION |
|---|---|---|---|---|
| FIXED PACKET START CODE | 24 | 3 | 00 0001h | |
| STREAM id | 8 | 1 | 1011 1101b | PRIVATE STREAM 1 |
| PES PACKET LENGTH | 16 | 2 | | |
| "10" | 2 | 3 | | |
| PES SCRAMBLE CONTROL | 2 | | T.B.D | |
| PES PRIORITY | 1 | | 00b | |
| DATA ORGANIZING INDICATOR | 1 | | 0 | |
| COPYRIGHT | 1 | | 0 | |
| ORIGINAL OR COPY | 1 | | 1 or 0 | |
| PTS_DTS FLAG | 2 | | 10b or 00b | |
| ESCR FLAG | 1 | | 0 | |
| ES RATE FLAG | 1 | | 0 | |
| DSM TRICK MODE FLAG | 1 | | 0 | |
| ADDITIONAL COPY FLAG | 1 | | 0 | |
| PES_CRC FLAG | 1 | | 0 | |
| PES EXPANSION FLAG | 1 | | 0 or 1 | |
| PES HEADER LENGTH | 8 | | 0 to 8 | |

FIG. 28A

| FIELD | NO. OF BITS | NO. OF BYTES | VALUE | DESCRIPTION |
|---|---|---|---|---|
| "0010" | 4 | 5 | SET BY PRODUCER | |
| PTS[32..30] | 3 | | | |
| marker_bit | 1 | | | |
| PTS[29..15] | 15 | | | |
| marker_bit | 1 | | | |
| PTS[14..0] | 15 | | | |
| marker_bit | 1 | | | |
| PES PRIVATE DATA FLAG | 1 | 3 | 0 | |
| PACK HEADER FIELD FLAG | 1 | | 0 | |
| PROGRAM PACKET SEQUENCE COUNTER FLAG | 1 | | 0 | |
| P_STD BUFFER FLAG | 1 | | 1 | |
| RESERVED | 3 | | 111b | |
| SECOND PES EXPANDED FLAG | 1 | | 0 | |
| "01" | 2 | | 01b | |
| P_STD BUFFER SCALE | 1 | | 1 | |
| P_STD BUFFER SIZE | 13 | | T.B.D | |
| PRIVATE HEADER DATA AREA | | | | |
| AUDIO DATA | | | | |

FIG. 28B

| FIELD | NO. OF BITS | NO. OF BYTES | VALUE | DESCRIPTION |
|---|---|---|---|---|
| SUBSTREAM id | 8 | 1 | 1010 0000b | PACKET FOR LINEAR PCM AUDIO |
| RESERVED | 4 | | | |
| ISRC NUMBER | 4 | 2 | | |
| ISRC DATA | 8 | | | |
| PRIVATE HEADER LENGTH | 8 | 1 | | |
| HEAD ACCESS UNIT POINTER | 16 | 2 | | |
| AUDIO EMPHASIZING FLAG | 1 | 1 | | |
| RESERVED | 1 | | 0b | |
| RESERVED | 2 | | 00b | |
| DOWNMIX CODE | 4 | | | |
| 1ST NO. OF QUANTIZATION BITS | 4 | 1 | | |
| 2ND NO. OF QUANTIZATION BITS | 4 | | | |
| 1ST AUDIO SAMPLING FREQUENCY | 4 | 1 | | |
| 2ND AUDIO SAMPLING FREQUENCY | 4 | 1 | | |
| RESERVED | 4 | 1 | 0000b | |
| MULTICHANNEL TYPE | 4 | | | |
| RESERVED | 3 | 1 | | |
| CHANNEL ASSIGNMENT | 5 | | | |
| DYNAMIC RANGE CONTROL INFORMATION | 8 | 1 | | |
| STUFFING BYTE | – | 0 to 7 | | |
| AUDIO DATA | | | | |

FIG. 29

DIGITAL AUDIO RECORDING MEDIUM AND REPRODUCING APPARATUS THEREOF

CROSS SECTION TO RELATED APPLICATIONS

This application is a Division of application Ser. No. 10/372,149, filed Feb. 25, 2003 now U.S. Pat. No. 7,050,370, which is a Divisional of application Ser. No. 09/340,039, filed on Jun. 28, 1999 now U.S. Pat. No. 6,580,671, both of which are hereby incorporated by reference. This application also claims priority to Japanese application 10-180319, filed Jun. 26, 1998 in the Japanese Patent Office, which is hereby incorporated by reference.

BACKGROUND OF THE INVENTION

This invention relates to a digital audio recording medium and a reproducing apparatus thereof. More particularly, this invention is applied effectively to a recording format of digital audio signals on a high-density recording medium, such as an optical disk, and to a reproducing apparatus for reproducing the high-density recording medium.

In recent years, high-density recording optical disks on which the main picture signal, plural types of sub-picture signals accompanying the main picture signal, and audio signals of plural channels can be recorded have been developed. The high-density recording optical disk is called DVD. Hereinafter, the technique is referred to as DVD video.

On the basis the DVD video technique, the DVD audio technique has been developed. The development of DVD audio has aimed at establishing audio special technology to achieve high sound quality.

In the development of DVD audio, there have been demands toward approaching the standard of DVD audio to the standard of the audio data structure in DVD video. A conventional equivalent relating to DVD audio has been disclosed in, for example, Jpn. Pat. Appln. KOKAI Publication No. 9-312066.

BRIEF SUMMARY OF THE INVENTION

It is, accordingly, an object of the present invention to provide not only a digital audio recording medium capable of realizing a DVD audio standard having a high-sound-quality specification by making the best use of the audio data structure in DVD video, but also a reproducing apparatus for the digital audio recording medium.

The foregoing object is accomplished by providing a recording medium which enables an audio signal digitized at a specific sampling frequency in a specific number of quantization bits to be recorded in a specific area on the recording side, and which comprises: a first sample data string created by digitizing a first one of channel audio signals at a first sampling frequency in a first number of quantization bits; a second sample data string created by digitizing a second one of the channel audio signals at a second sampling frequency in a second number of quantization bits; and header data including timing data to synchronize the first sample data string with the second sample data string, wherein the first sample data string, the second sample data string, and the header data are recorded on the recording medium.

The recording medium further comprises means for decoding the data read from the recording medium into plural channel audio signals. Moreover, the recording medium further comprises means for transferring a signal of the above data structure and recording it on a recording medium. Additionally, the recording medium further comprises means for transferring a signal of the above data structure.

Use of those means makes it possible to put all the data transfer rates in a specific data transfer rate range, because the sampling frequency or the number of quantization bits for the first channel audio signal is made different from that for the second channel audio signal. This enables high-quality sound to be obtained in the data transfer rate range complying with the desired standard. Such data as assures high-quality sound can be recorded on the recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A to 1D show DVD video data sample structures and sample arrangements related to the present invention;

FIG. 6 is a table to help explain the sizes of linear PCM data related to DVD video;

FIG. 7 is a table to help explain the pack header of an audio pack;

FIG. 8 is a table to help explain the packet header of an audio pack;

FIG. 24 is a table to help explain an audio title set information management table related to the present invention;

FIG. 26 is a table to help explain a channel allocation table associated with the present invention;

FIGS. 28A and 28B are tables to help explain the contents of the packet header in the audio pack of FIG. 27;

FIG. 29 is a table to help explain the contents of the private packet header in the audio pack of FIG. 27;

DETAILED DESCRIPTION OF THE INVENTION

Figure 2:
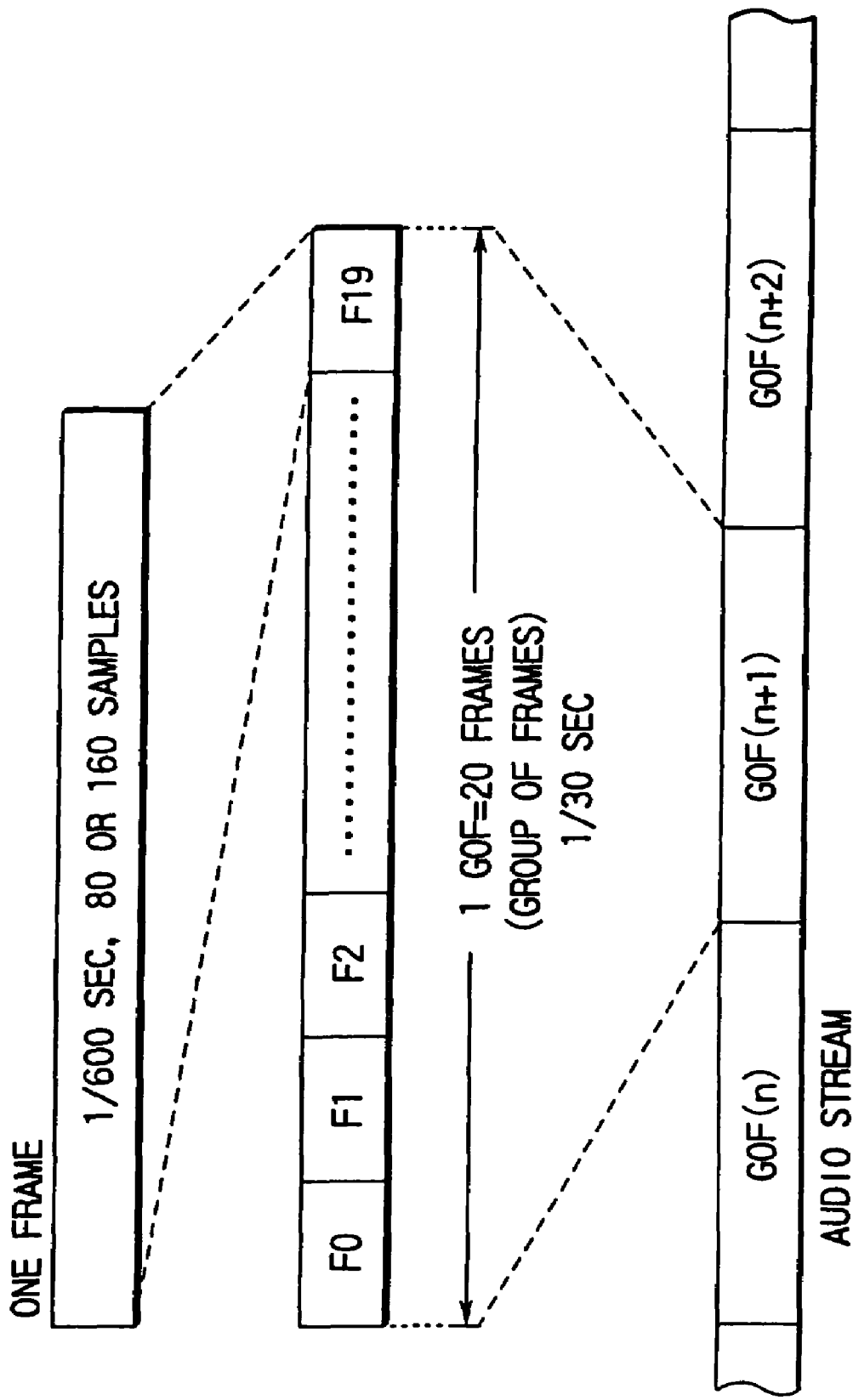
FIG. 2 is a diagram to help explain an example of the arrangement of packs related to DVD video and the structure of an audio pack in the arrangement.

Hereinafter, referring to the accompanying drawings, an embodiment of the present invention will be explained in detail. First, the audio signal recording format defined in the DVD video standard will be explained.

Explanation will be given, using data arrangement by linear PCM (Pulse Code Modulation) as an example. In linear PCM explained below, it is assumed that for example, the number of quantization bits is 16, 20, or 24, depending on the situation.

There are eight types of audio mode: monaural (channel 1), stereo (channel 2), channel 3, channel 4, channel 5, channel 6, channel 7, and channel 8.

Audio signals of eight channels A to H are used. Each of the audio signals is sampled at a sampling frequency of 48 kHz or 96 kHz and then quantized. Explanation will be given on the assumption that, for example, the number of quantization bits is 20.

FIG. 1A shows that audio signals of eight channels A to H have been sampled. Each sample data item is assumed to be quantized in, for example, 20 bits. Each 20-bit sample data item is divided into a main word and an extra word.

The main words of channels A to H are represented by uppercase letters of the alphabet An to Hn and the extra words are indicated by lowercase letters an to hn. Herein, subscript n (n=0, 1, 2, 3, ... ) indicates the order of samples. Each main word contains 16 bits. Each extra word contains 4 bits.

Therefore, each sample data item is formed as follows:

An audio signal of channel A is made up of A0, a0, A1, a1, A2, a2, A3, a3, A4, a4 ....

An audio signal of channel B is made up of B0, b0, B1, b1, B2, b2, B3, b3, B4, b4 ....

An audio signal of channel C is made up of C0, c0, C1, c1, C2, c2, C3, c3, C4, c4 ....

An audio signal of channel H is made up of H0, h0, H1, h1, H2, h2, H3, h3, H4, h4 ....

FIG. 1B shows the arrangement format of each word in a sample train when the aforementioned main words and extra words are recorded on a recording medium.

Specifically, each sample data item containing 20 (=M) bits is divided into a 16 (=m1) bit main word on the MSB (Most Significant Bit) side and a 4 (=m2) bit extra word on the LSB (Least Significant Bit) side.

First, 0 (=2n)-th main words A0 to H0 of channels A to H are arranged collectively. Next, first (=2n+1) main words A1 to H1 of channels A to H are arranged collectively.

Then, 0 (=2n)-th extra words a0 to h0 of channels A to H are arranged collectively. Next, first (=2n+1) extra words a1 to h1 of channels A to H are arranged collectively, where n=0, 1, 2 ....

A group of main words A0 to H0 of channels A to H is referred to as main sample S0; a group of main words A1 to H1 of channels A to H is referred to as main sample S1; a group of main words A2 to H2 of channels A to H is referred to as main sample S2; and so forth.

A group of extra words a0 to h0 of channels A to H is referred to as extra sample e0; a group of extra words a1 to h1 of channels A to H is referred to as main sample e1; a group of extra words a2 to h2 of channels A to H is referred to as extra sample e2; and so forth.

FIG. 1B shows the individual sample data items are arranged in this order: main sample S0 of main words A0 to H0, main sample S1 of main words A1 to H1, extra sample e0 of extra words a0 to h0, extra sample e1 of extra words a1 to h1, ....

Such a set of two main samples and two extra samples is referred to as a 4-sample or a two-pair sample.

With this format, when data is reproduced with a simplified machine (e.g., a machine that operates in a 16-bit mode), only the main word in one of the channels is handled for playback or, in stereo, only the main words in two of the channels are handled for playback.

When data is reproduced with a high-level machine (e.g., a machine that operates in a 20-bit mode), the main word and the corresponding extra word are handled for playback.

FIG. 1C shows the arrangement of main samples and extra samples by using the specific number of bits (16) in eight main words constituting a main sample and the specific number of bits (4) in eight extra words constituting an extra sample.

By dividing a 20-bit sample data item in a quantized linear PCM code into a 16-bit main word and a 4-bit extra word, the following becomes possible.

In the case of a simplified machine that operates in a 16-bit mode, when a sample arrangement is dealt with, the unnecessary portion can be discarded easily by processing the data in units of eight bits in the extra sample areas.

This is because the amount of data in two extra samples constituting a two-pair sample is 4 bits×8 channels+4 bits×8 channels. This amount of data can be processed (discarded) in units of eight bits eight times consecutively.

The feature of such a sample arrangement is not limited to the embodiment. For instance, both when the number of channels is odd and when an extra word contains eight bits, the total number of bits in two consecutive extra samples is an integral multiple of eight bits.

Consequently, with the simplified machine that reproduces only main words, extra samples can be skipped easily by executing an 8-bit n-times consecutive discarding process according to the mode.

In the sample arrangement of FIG. 1B, the data may be modulated and recorded onto a recording medium (onto the tracks on an optical disk). In addition, when the data is recorded together with other control information, it is desirable that the data should be recorded in such a form as facilitates time management, to facilitate data handling and synchronization. To achieve this, the following framing, grouping of frames, and packeting are effected.

FIG. 1D shows an audio frame train. Specifically, a unit of data with a specific playback time (1/600 sec) is defined as one frame. To one frame, 80 or 160 samples are allocated.

When the sampling frequency at which an audio signal is sampled is 48 kHz, one sample corresponds to 1/48000 sec and the time needed for one frame is (1/48000 sec)×80 samples=1/600 sec.

Furthermore, when the sampling frequency is 96 kHz, one sample corresponds to 1/96000 sec and the time needed for one frame is (1/96000 sec)×160 samples=1/600 sec. Thus, either 80 samples or 160 samples are allocated to one frame.

FIG. 2 shows the relationship between one frame and one group of frames. One frame contains 80 or 160 samples and is 1/600 sec of data. One GOF contains 20 frames. Then, one GOF corresponds to the period of (1/600 sec)×20=1/30 sec.

This is the frame frequency in television. A series of such GOFs makes an audio stream. Determining a unit of one GOF this way is effective in synchronizing an audio stream with a video signal.

The frame is further divided into packets to record the data on the same recording medium on which other control signals and video signals have been recorded. The relationship between the packet and frame will be explained below.

Figure 3A:
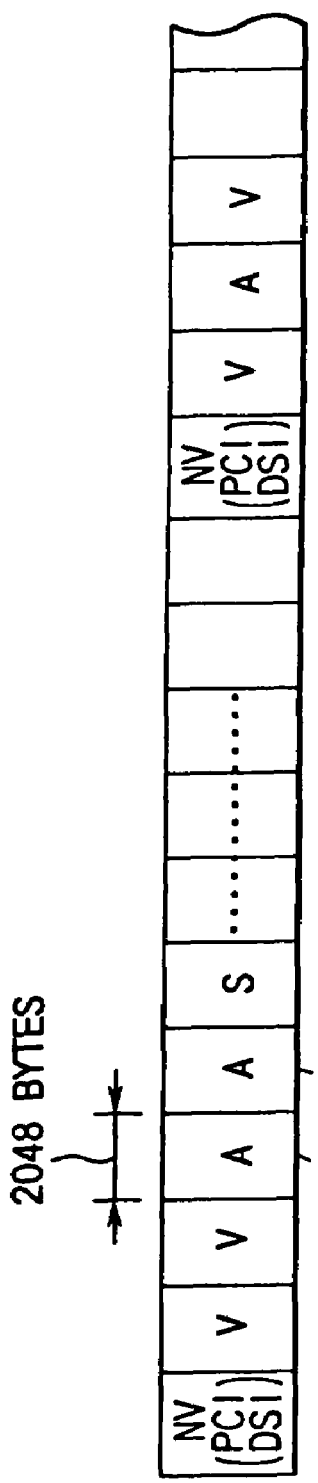
FIGS. 3A and 3B are diagrams to help explain in detail the structure of an audio pack related to DVD video.

FIG. 3A shows the relationship between packets and frames. NV indicates a navigation pack. In the navigation pack NV, a pack header, a packet header, PCI_PKT (presentation control packet), and DSI_PKT (data search information packet) are written.

The data in DSI_PKT is data search information. V means a video object pack, A means an audio object pack, and S means a sub-picture object pack.

One pack is specified to contain 2048 bytes. In addition, one pack includes one packet and is composed of a pack header, a packet header, and a packet. In DSI_PKT, information to control each data item in playback, including the start address and end address for each pack, is written.

Figure 3B:
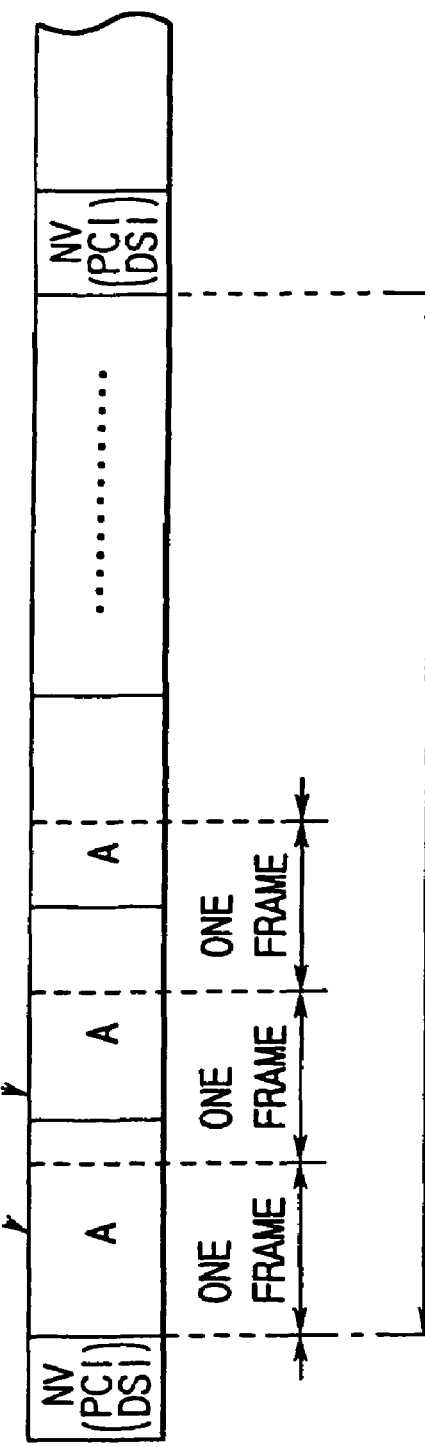

In FIG. 3B, only audio packs are shown. Actually, as shown in FIG. 3A, DSI_PKTs, video packs V, and audio packs A are actually arranged in a mixed manner. In FIG. 3B, however, only audio packs A are extracted and shown to make it easier to understand the relationship between frames and packs.

In the standard for the system, as much information as makes the playback time between one DSI_PKT and the next DSI_PKT about 0.5 sec is specified to be provided. Since one frame corresponds to 1/600 sec, the number of audio frames existing between one DSI_PKT and the next DSI_PKT is 30 frames.

The amount D of data in one frame differs depending on the sampling frequency fs, the number of channels N, and the number of quantization bits Qb. Specifically, when fs=48 kHz, then D=80×N×Qb. When fs=96 kHz, then D=160×N×Qb.

Accordingly, one frame does not necessarily correspond to one pack. One pack may correspond to plural frames or to less than one frame. As a result, the head of a frame is positioned in the middle of one pack as shown in FIG. 3B.

Positional information on the frame head is written in the pack header as the number of data items (timing) counted from the pack header or DSI_PKT. Thus, with the reproducing apparatus, when the recording medium is played back, a frame is taken out of the audio packet, and the data in the channel to be reproduced is extracted and loaded into an audio decoder, which then performs a decoding process.

Figure 4A:
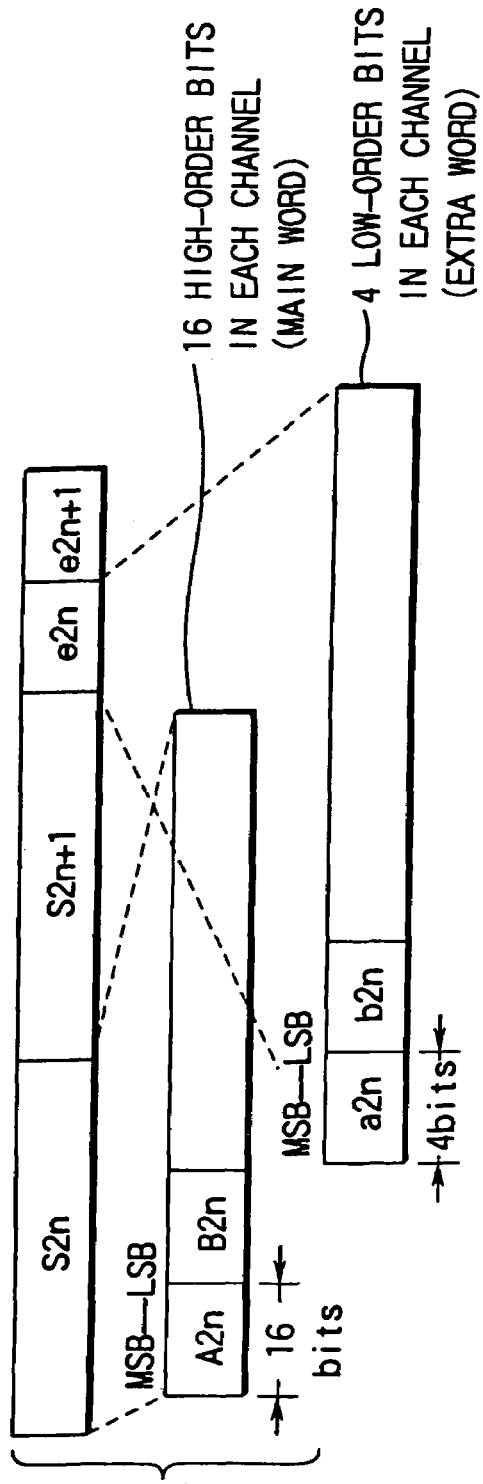
FIGS. 4A and 4B are diagrams to help explain examples of the data sizes in a packet in linear PCM data.
Figure 4B:
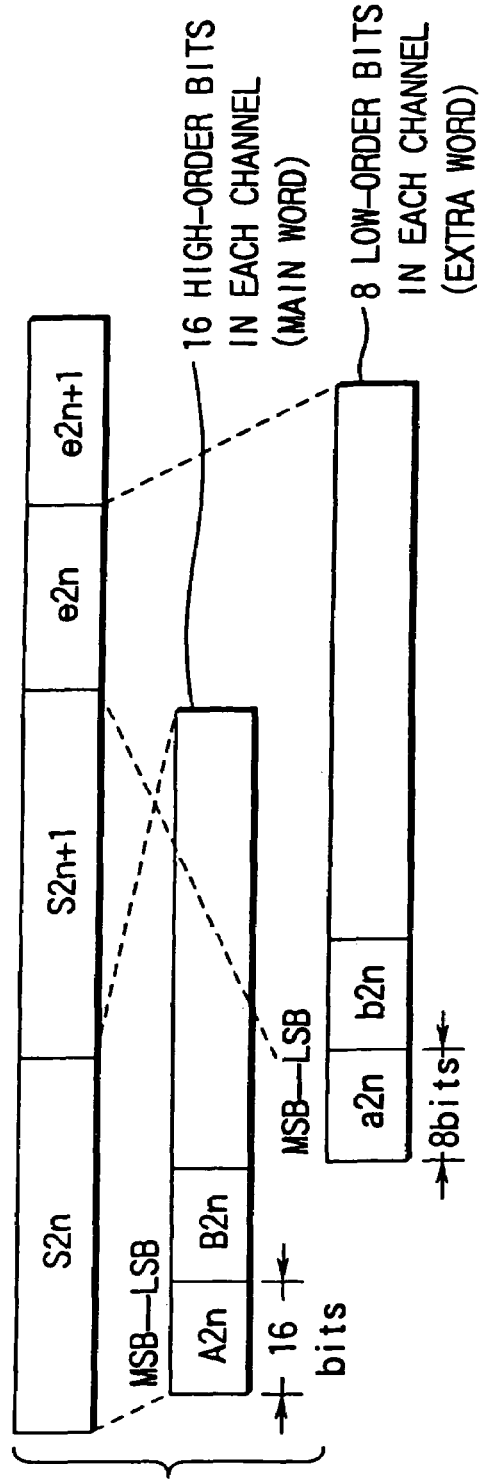

FIG. 4A shows how a 16-bit main word and a 4-bit extra word are arranged when 20 quantization bits are used. FIG. 4B shows how a 16-bit main word and an 8-bit extra word are arranged when 24 quantization bits are used.

As shown in FIGS. 4A and 4B, the sample data is structured into a frame and a pack in an integral multiple of one unit, which consists of two pairs of samples, each pair consisting of a main sample and an extra sample.

As described above, it is possible to provide a data arranging method of recording or transmitting multichannel-compatible linear PCM data that can be reproduced with both a simplified machine and a high-level machine, a recording medium on which data has been recorded by the method, and a reproducing apparatus for the recording medium.

As described above, as much information as makes the playback time between one DSI_PKT and the next DSI_PKT about 0.5 sec is specified to be provided in the standard for the system.

One pack is made up of a pack header, a packet header, and a packet data section. In each of a pack header and a packet header, the information necessary to reproduce an audio signal is written. The information includes the size of the audio pack, the presentation time stamp PTS for timing playback output to video, the channel (or stream) identification code, the number of quantization bits, the sampling frequency, the data start address, and the data end address.

The audio signal is inserted into a packet by using a two-pair sample as a unit. A two-pair sample is made up of two main samples and two extra samples shown in FIGS. 1A to 1C.

Figure 5:
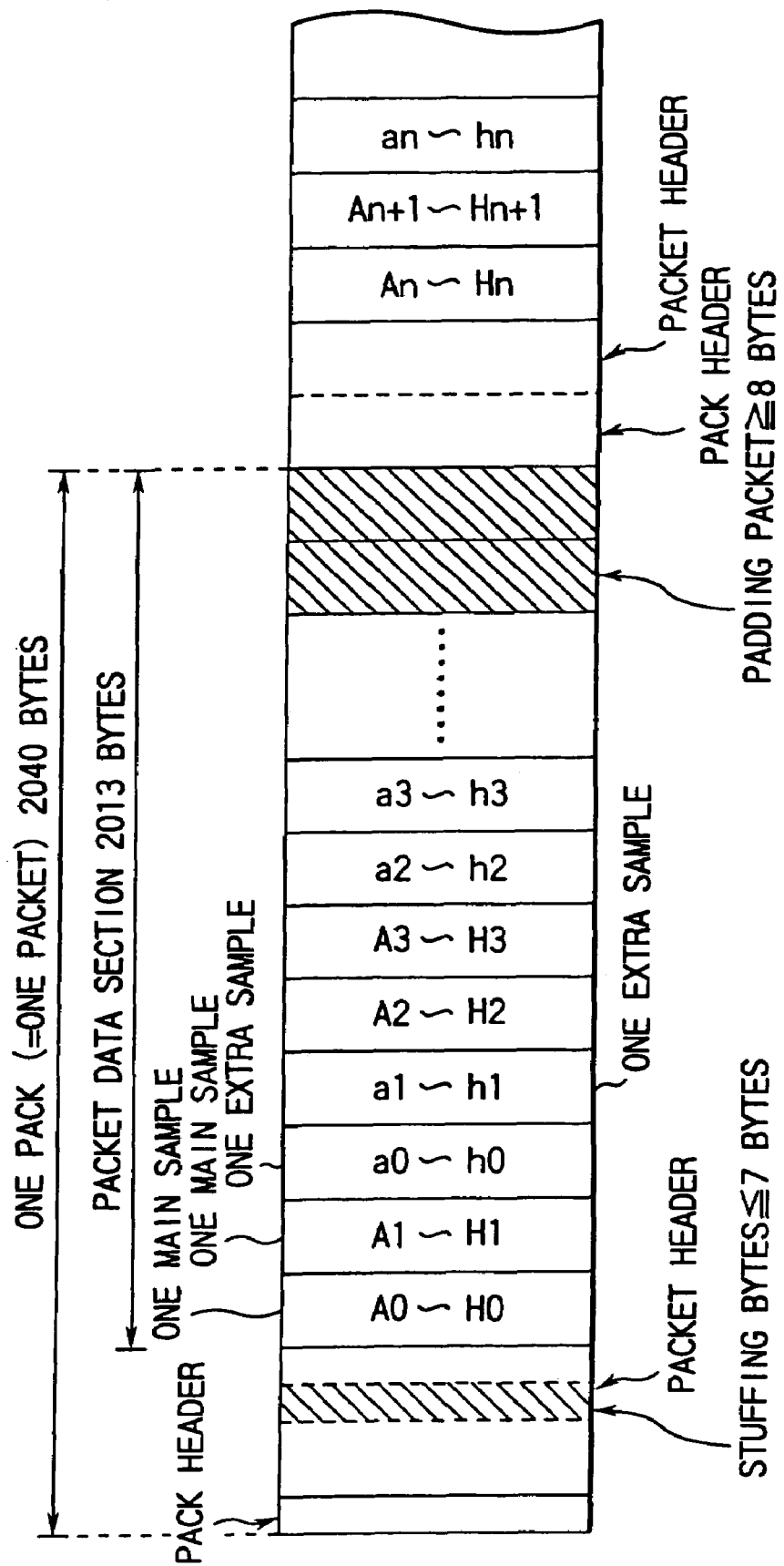
FIG. 5 is a diagram to help explain an example of creating an audio pack related to DVD video.

FIG. 5 is an enlarged view of an audio pack. In the data section of the audio pack, the first main samples S0, S1 (main words A0 to H0, A1 to H1) of a two-pair sample are placed at the head of the data area. After that, the audio signals are arranged in units of a two-pair sample.

The number of bytes in one pack is fixed to 2048. On the other hand, since the sample data is variable-length data, 2048 bytes are not necessarily an integral multiple of a two-pair sample.

Therefore, the maximum byte length of one pack may differ from the byte length of (a two-pair sample×an integer). In this case, an adjustment is made so as to meet the expression: the byte length of a pack≧(a two-pair sample× an integer). When part of a pack is left, the following measure is taken.

When the residual part of a pack contains seven bytes or less, stuffing bytes are inserted. When the residual part of a pack contains more than seven bytes, or eight bytes or more, padding packets are inserted in the end of the pack as shown by the shaded portion in FIG. 5.

With audio information of this pack form, handling is easy during playback. Specifically, because the audio data at the head of each pack is always the head of a two-pair sample, that is, main samples S0, S1, playback with timing is achieved easily.

This is because the producing apparatus takes in data in packs and processes the data. If an audio data sample were placed in such a manner that it extends over two packs, the reproducing apparatus would take in two packs, integrate the audio data items, and decode the resulting data item, which would complicate the process.

In the method of the present invention, however, the audio data at the head of each pack is always the head of a two-pair main sample and the audio data items are grouped in packs. This allows timing to be done for only one pack, which makes the processing easier.

Because the data is segmented in packets, the authoring system (support system) is simplified and software for data processing is also simplified.

Particularly in special playback, the video data is thinned out intermittently or interpolated. In this case, playback timing is controlled relatively easily because the audio data can be handled in packets. The decoder software is also not complicated.

While in the above system, the 20-bit sample data is divided into the high-order 16 bits and the low-order 4 bits to form a sample, the data is not necessarily limited to this form. As long as it is obtained by sampling linear PCM audio data, it may take another form.

For example, when the data length of an extra sample is 0, the data string is composed of consecutive main samples, which is a general data form. In this case, because there is no extra sample, a two-pair sample need not be used as a unit and may be packeted in main samples.

FIG. 6 shows the size of linear PCM data when linear PCM data is arranged in a packet in units of a two-pair sample. Specifically, the audio stream mode is classified into monaural (channel 1), stereo (channel 2), and multichannels 3 to 8. Each class is further divided by the number of quantization bits. Each number indicates the maximum number of samples fitting into one packet.

Because a two-pair sample unit is used, the number of samples in any packet is even. As the number of channels increases, the number of bytes increases accordingly, which decreases the number of samples in one packet.

When the number of quantization bits is 16 in monaural, the number of samples in one packet is 1004, the number of bytes is 2008, and the number of stuffing bytes is 5, and the number of padding bytes is 0 except that the number of stuffing bytes in the first packet is two bytes. This is because three bytes of attribute information may be added to the header of the first packet.

In the stereo mode in which 24 quantization bits are used, six bytes are stuffed in the first packet and nine bytes are stuffed in any one of the following packets.

FIG. 7 shows an outline of the pack header of an audio pack. A pack start code (four bytes) is first written, followed by a system clock reference SCR. The system clock reference SCR indicates the time required to take in the pack. When the value of SCR is smaller than the value of the reference time in the reproducing apparatus, the pack to which the SCR has been given is loaded into the audio buffer.

In the pack header, the program multiplex rate is written in three bytes and the stuffing length is written in one byte. Referring to the stuffing length, a control circuit can determine a control information read address.

FIG. 8 lists the contents of the packet header in an audio packet. The packet header includes a packet start code prefix to tell the start of the packet, a stream ID to show what kind of data the packet has, and data on the length of the packet elementary stream PES.

In the packet elementary stream PES, various types of information are written. They include, for example, a flag to prohibit or permit copying, a flag to tell whether the information is the original one or copied one, and information on the length of the packet header.

Furthermore, in the packet header, a presentation time stamp PTS to synchronize the packet with the other video and sub-picture in terms of temporal output is also written. Additionally, in each video object, a flag to tell where a description has been made about a buffer and the size of the buffer are written in the first packet in the first field. The packet header also has 0 to 7 stuffing bytes.

The packet header further has a substream ID to tell an audio stream, whether linear PCM or another compression method is used, and the audio stream number. In the packet, the number of audio frames in which the head byte data items are located is written. Furthermore, a pointer to specify the first audio frame in a packet to be reproduced at the time specified by the PTS, or the first byte of a unit to be first accessed.

The pointer is written by the byte number counted from the last byte in the information and indicates the first byte address in the audio frame. Furthermore, an audio emphasizing flag to tell whether the high-frequency is emphasized or not, a mute flag to mute sound when all the audio frame data items are 0, and a frame number to be accessed first in the audio frame group (GOF) are written in the packet.

Furthermore, in the packet, the length of a quantization word or the number of quantization bits, the sampling frequency, the number of channels, and dynamic range control information are written.

The header information is analyzed at the decoder control section (not shown) in the audio decoder. The decoder control section switches the signal processing circuit of the decoder to the signal processing mode compatible with the audio data items presently being taken in.

Because information similar to the header information is also written in a video manager, once such information has been read at the beginning of the playback operation, it need not be read from now on, as long as the same substream is reproduced.

The reason why information on the necessary mode for reproducing audio is written in the header of each packet is that a reception terminal is allowed to recognize the audio mode whenever it starts to receive the data in a case where a packet train is transmitted via a communication system.

Another reason is that the audio information is made reproducible even when the audio decoder takes in only packs.

In the audio data format based on the DVD video standards, the maximum transfer rate of audio data is 6.144 Mbps and the maximum transfer rate of the sum of all the audio data streams is 9.8 Mbps. The attributes (including the sampling frequency fs, the number of quantization bits Qb, and the number of channels N) for each channel are the same in a stream. The restrictions have been determined in the DVD video standard.

Because of the restrictions, high-sound-quality specifications cannot be realized in multichannel audio, such as surround, (e.g., six channels, R, L, C, SR, SL, and SW, are present in one stream).

Specifically, with the restrictions, the sampling frequency fs and the number of quantization bits Qb for every channel must be the same. Therefore, when an attempt is made to realize high quality sound (e.g., fs=96 kHz), all the channels have to be dealt with in the same manner, which makes the value of transfer rate increase and eventually exceed a specified value.

For example, the transfer rate per channel (ch) at a sampling frequency of fs with the number of quantization bits of Qb is as follows in only the audio data section:
  2.304 Mbs/ch at 96 kHz with 24 bits
  1.92 Mbs/ch at 96 kHz with 20 bits
  1.536 Mbs/ch at 96 kHz with 16 bits
  1.152 Mbs/ch at 48 kHz with 24 bits
  0.96 Mbs/ch at 48 kHz with 20 bits
  0.76 Mbs/ch at 48 kHz with 16 bits Thus, high-sound-quality specifications that can be realized under the restrictions in the DVD video standard cover six channels at 48 kHz with 20 bits (in this case, the audio transfer rate is 0.96×6=5.76 Mbps<6.144 Mbps). Because of the restrictions, better specifications cannot be realized.

To overcome this drawback, the present invention modifies the data structure complying with the DVD audio standard and fulfilling high-sound-quality audio signal specifications, while leaving the type of the audio data structure in the DVD standard as much as possible.

Hereinafter, the basic concept of the present invention will be explained on the basis of comparison between the DVD video standard and the DVD audio standard. Specifically, it is decided that the size of an audio pack in DVD audio is 2048 bytes as in DVD video. It is also decided that the number of quantization bits Qb is Qb=16 bits, 20 bits, or 24 bits as in the audio specifications in DVD video.

In DVD audio, the number of linear PCM audio streams to be transferred simultaneously is limited to one. Specifically, in DVD video, when the contents of movies are recorded as a video object, the individual languages are allocated to the individual channels of audio streams, which enables the audio streams to be selectively changed.

Since DVD audio basically deals with music contents, selective changing is not necessarily done for each stream. This enables all the channels to be reproduced and outputted simultaneously. In the present invention, the linear PCM audio streams to be transferred simultaneously are put together into a group as described above.

The maximum transfer rate in DVD audio is increased from 6.144 Mbps to 9.6 Mbps. For all the data streams in DVD video, the individual packs for video data, sub-picture data, audio data, and navigation data are time-division-multiplexed and transferred.

The maximum transfer rate including all the transfer data is limited to 9.6 Mbps. Thus, it is difficult to make the audio data transfer rate higher than 6.144 Mbps.

Because all the data in DVD audio is made up of audio data except for some control data, the amount of audio data is increased, which increases the transfer rate.

Since the maximum transfer rate in DVD audio is increased as described above, the number of samples in one audio frame as explained in FIG. 2 is halved. Thus, it is decided that the number of samples at a sampling frequency of fs is as follows:
  40 samples/frame at fs=48 kHz or 44.1 kHz
  80 samples/frame at fs=96 kHz or 88.2 kHz
  160 samples/frame at fs=192 kHz or 176.4 kHz.

In DVD video, 44.1 kHz, 88.2 kHz, 176.4 kHz, and 192 kHz are not supported. The purpose of not supporting them is to put at least one audio pack in one audio frame and allow an audio frame to necessarily have data on a presentation time stamp PTS (data to synchronize the data with the system time stamp during playback).

Furthermore, DVD audio employs a scalable method to realize high-sound-quality audio specifications superior to DVD video. Specifically, in the prior art, all the channels in one stream have the same attributes concerning the sampling frequency fs and the number of quantization bits Qb. In contrast, the present invention permits channels with different attributes to exist in one stream.

This is based on the fact that, for example, of six channels, R (right channel), L (left channel), C (center channel), SR (rear right channel), SL (rear left channel), and SW (low-frequency channel), it is not necessary to set all the channels to high sound quality (at a high sampling frequency of fs) and that when the main channels (for example, R and L) are set to high sound quality (e.g., fs=96 kHz) and the other sub-channels (C, SR, SL, and SW) are set to present sound quality (fs=48 kHz), this provides sufficiently high sound quality on the whole.

The concept of an audio system using the scalable method will be explained briefly. The goal is to make the maximum transfer rate of signals in one channel group 6.144 Mbps or less and the maximum transfer rate of the sum of transfer rates of signals in one stream 9.8 Mbps or less.

The channel group means digital signals including stereo R and L channels (two main channels). A stream into which C, SR, SL, and SW are put together is also one channel group.

Following is an explanation of how to record, for example, six channel audio signals on a recording medium. The six channels here include R, L, C, SR, SL, and SW in the surround method. Signals corresponding the individual channels are produced.

R and L may be used as main channels and the others as subchannels. When the signal of each channel is reproduced and supplied to a speaker, this produces a three-dimensional acoustic effect.

With the method of the present invention, the six channels are produced in the form of a first channel group and a second channel group. In this case, R and L of great importance are selected as channels constituting the first channel group and C, SR, SL, and SW are selected as channels constituting the second channel group.

In this case, an audio signal in the first channel group is sampled at a high sampling frequency of fs and an audio signal in the second channel group is sampled at a sampling frequency of fs/2 (one over an integer).

Figure 9A:
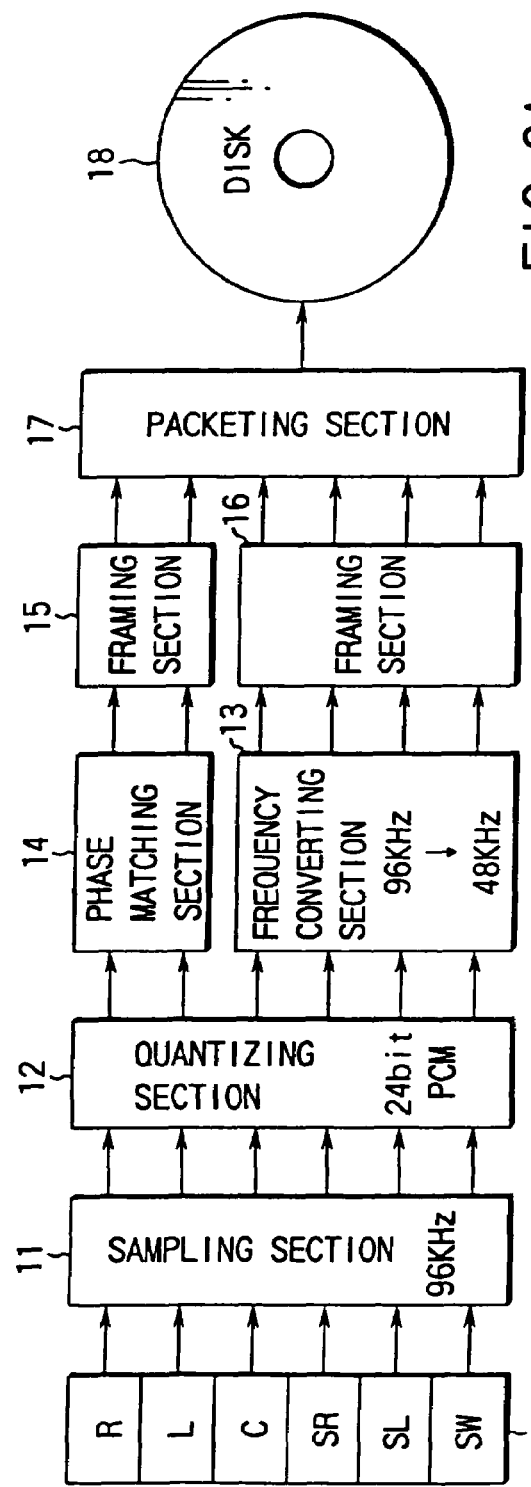
FIGS. 9A and 9B are block diagrams showing the basic configuration of a disk recording apparatus and that of a disk reproducing apparatus, respectively, both employing scalable.

FIG. 9A is a block diagram of a recording system for the audio signal in the first channel group and that of a recording system for the audio signal in the second channel group. An analog signal source 10 has the signals in the R, L, C, SR, SL, and SW channels used in the surround method and supplies them to a sampling section 11.

The sampling section 11 samples each inputted channel signal at a sampling frequency of fs=96 kHz. Each signal sampled at the sampling section 11 is inputted to a quantizing section 12, which quantizes the signal into 24-bit sample data. The 24-bit sample data is converted into a PCM signal.

Next, each of the C, SR, SL, and SW channels is inputted to a frequency converting section 13, which converts the sampling frequency fs of 96 kHz into half of 96 kHz, or 48 kHz.

On the other hand, each of the R and L channel signals sampled at 96 kHz is inputted to a phase matching section 14, which matches the phase of one sample with that of another. Actually, the same amount of delay as that in the frequency converting section 13 is set in the phase matching section 14. The delayed 96-kHz R and L channel signals are inputted to a framing section 15, which frames the signals in units of a specific number of samples.

The frequency-converted 48-kHz signal in each of the C, SR, SL, and SW channels is inputted to a framing section 16, which frames the signal in units of a specific number of samples.

The signals framed at the frame processing sections 15, 16 are inputted to a packeting section 17, which converts them into a packet in a specific format. In this way, a 96-kHz route stream (a stream with a first attribute Atr1) and a 48-kHz route stream (a stream with a second attribute Atr2) are obtained.

These two streams are identified by the identifiers (ID) given to their packet headers. The packets in the two channel groups are further packed and multiplexed and then recorded on a disk 18 via a recording section (not shown).

Figure 9B:
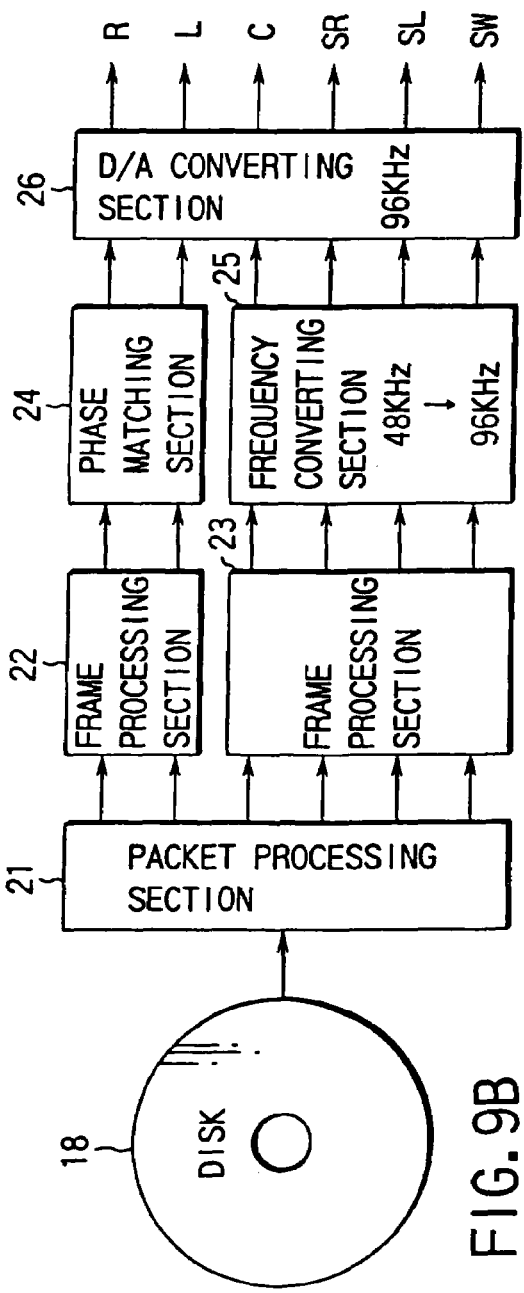

When the signal recorded on the disk 18 is reproduced, the following processing is done. FIG. 9B shows a reproducing system for the audio signal in the first channel group and a reproducing system for the audio signal in the second channel group.

First, the signal read optically from the disk 18 passes through a demodulating section (not shown) and is inputted to a packet processing section 21. The demodulating section performs an error correction process and a modulating process. The packet processing section 21 identifies a channel group, referring to the identifier of the packet header. The identification discriminates between the packet in the first channel group and the packet in the second channel group. Namely, signals in the individual channel groups are divided or demultiplexed.

Then, the signal in the first channel group is inputted to a frame processing section 22, which cancels the frame and outputs a R channel signal and an L channel signal. The signal in the second channel group is inputted to a frame processing section 23, which cancels the frame and outputs C, SR, SL, and SW channel signals.

The R and L channel signals are inputted to a phase matching section 24. The C, SR, SL, and SW channel signals are inputted to a frequency converting section 25, which up-converts the sampling frequency fs of 48 kHz into 96 kHz.

The R and L channel signals and C, SR, SL, and SW channel signals which are matched in phase and have the same sampling frequency fs are inputted to a 96-kHz D/A (digital/analog) converting section 26, which converts them into PCM signals and then into analog signals.

By the above processes, the high-quality R and L channel signals and the normal C, SR, SL, and SW channel signals are reproduced.

In the present invention, the number of sample data items in one frame is set to such a value as takes $\frac{1}{600}$ sec in playback. Therefore, the number of sample data items in one frame differs between the 96-kHz route stream (the first channel group) and the 48-kHz route stream (the second channel group).

Figure 10:
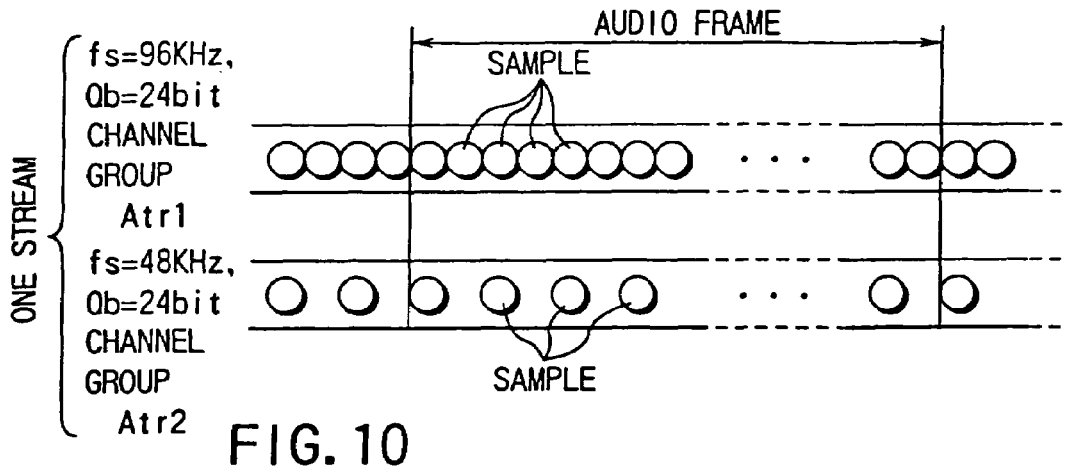
FIG. 10 is a diagram to help explain the principle of scalable applied to the present invention, using an example of samples.

In FIG. 10, the number of sample data items in one frame in the first channel group is compared with that in the second channel group. The phase matching section 14 matches the phase of the first channel group with that of the second channel group to produce a frame.

Then, the framing sections 15, 16 add the same presentation time stamp PTS to the heads of the corresponding frames (the frames to be reproduced at the same time) in the first and second channel groups. As a result, when the frame processing sections 22, 23 cancel the frames in playback and supply the results to the D/A converting section 26, the timing of canceling each frame is such that the frames with the same presentation time stamp PTS are canceled simultaneously.

As described above, in DVD audio, a group of channel groups which would normally constitute one audio stream is divided into two attribute groups Atr1 and Atr2. The attributes include the sampling frequency fs, the number of quantization bits Qb, and the number of channels N. When the attributes of all the channels in one stream are the same, the channel group need not be divided into two attribute groups.

In the case of the surround six channels, the attributes (Atr1) for the first channel group made up of R and L are such that the sampling frequency fs is 96 kHz and the number of quantization bits Qb is 24, and the attributes (Atr2) for the second channel group made up of C, SR, SL, and SW are such that the sampling frequency fs is 48 kHz and the number of quantization bits Qb is 24.

In this case, the transfer rate is 2.304×2+1.1152×4=9.216 Mbps, which fulfills the maximum transfer rate of 9.8 Mbps. Therefore, use of the scalable method makes it possible to produce an audio data structure fulfilling the high-sound-quality audio specifications.

In the above explanation, the sampling frequency fs and the number of quantization bits Qb have been included in the attributes in the first and second channel groups.

In the method of the present invention, various combinations of the sampling frequency fs and the number of quantization bits Qb can be considered as follows: a case where the sampling frequency fs differs and the number of quantization bits Qb is the same, a case where the sampling frequency fs is the same and the number of quantization bits Qb differs, a case where the sampling frequency fs is the same and the number of quantization bits Qb is the same, and a case where the sampling frequency fs differs and the number of quantization bits Qb differs. The point is that a stream fulfilling the maximum transfer rate of 9.8 Mbps is formed.

Figure 11:
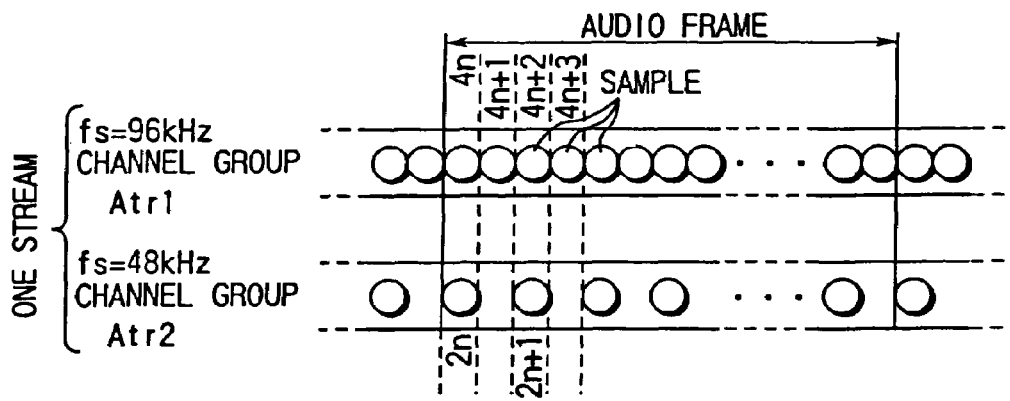
FIG. 11 is a diagram to help explain the principle of scalable applied to the present invention, using another example of samples.

FIG. 11 shows case 1. In case 1, attribute Atr1 for the first channel group is the sampling frequency fs of 96 kHz and attribute Atr2 for the second channel group is the sampling frequency fs of 48 kHz.

Figure 12:
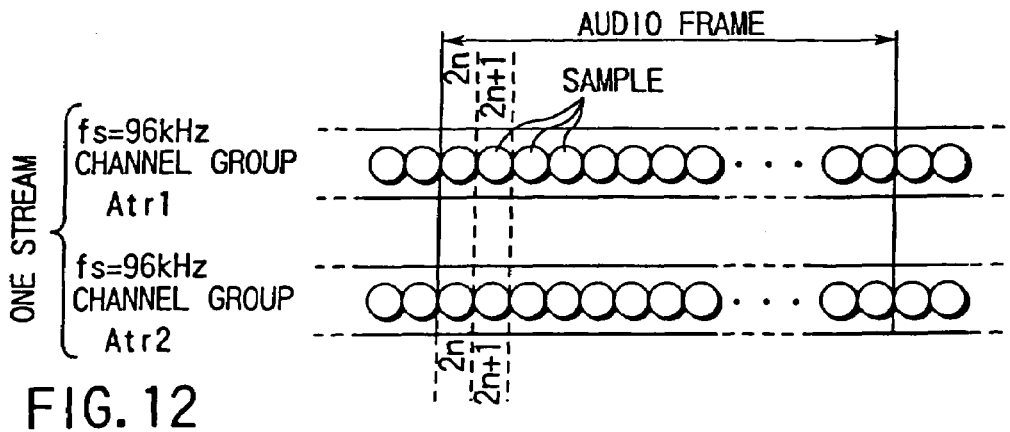
FIG. 12 is a diagram to help explain the principle of scalable applied to the present invention, using still another example of samples.

FIG. 12 shows case 2. In case 2, attributes Atr1 and Atr2 for the first and second channel groups are both the sampling frequency fs of 96 kHz.

Figures 13, 14, 15:
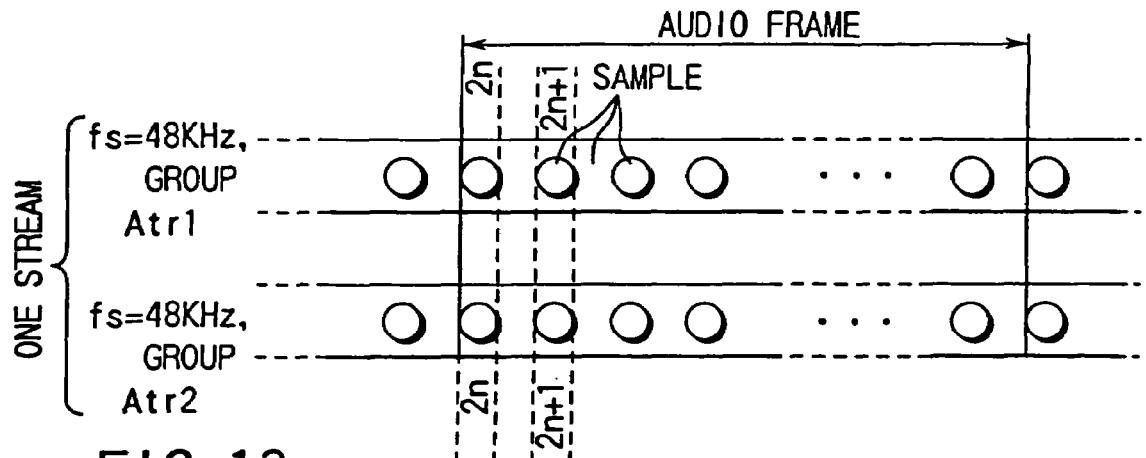
FIG. 13 is a diagram to help explain the principle of scalable applied to the present invention, using still another example of samples.
FIG. 14 is a diagram to help explain an example of the data sample structure associated with the present invention.
FIG. 15 is a diagram to help explain another example of the data sample structure associated with the present invention.

FIG. 13 shows case 3. In case 3, attributes Atr1 and Atr2 for the first and second channel groups are both the sampling frequency fs of 48 kHz.

When plural channel groups with different attributes exist in one stream, the method of the present invention uses the following data structure.

The data structure of FIG. 14 corresponds to case 1 of FIG. 11. In FIG. 14, the sampling frequency fs is 96 kHz and the number of quantization bits Qb is 16 for the attribute Atrt1 in the first channel group and the sampling frequency fs is 48 kHz and the number of quantization bits Qb is 16 for the attribute Atrt2 in the second channel group. Furthermore, the data structure is based on the scalable method and resembles the DVD video sample arrangement structure.

Specifically, four samples S4n, S4n+1, S4n+2, and S4n+3 are main samples with the first attribute and two samples S2n and S2n+1 are main samples with the second attribute. In this case, because the number of quantization bits Qb in the first attribute and that in the second attribute are both 16, no extra sample exists.

In this example, four samples in the first channel group correspond to two samples in the second channel group because of the sampling frequency fs. Four samples are fundamental in the first channel group serving as a main group. When the second channel group is taken into account, six samples are fundamental on the whole.

Specifically, the data structure of FIG. 14 is such that the signals in the first channel group, at least two of the channels, are sampled at a first frequency and the signals in the second channel group, other channels, are sampled at a second frequency.

First, the S4n-th, S4n+1-th, S4n+2-th, and S4n+3-th main samples in the individual channels constituting the first channel group sampled at the first frequency are arranged in sequence, then the S2n-th and S2n+1-th main samples in the individual channels constituting the second channel group sampled at the second frequency are arranged in sequence, where n=0, 1, 2, . . . .

The data structure of FIG. 15 corresponds to case 2 of FIG. 12. In FIG. 15, the sampling frequency fs is 96 kHz and the number of quantization bits Qb is 24 for the attribute Atrt1 in the first channel group and the sampling frequency fs is 96 kHz and the number of quantization bits Qb is 20 for the attribute Atrt2 in the second channel group.

In this case, two-pair samples S2n, S2n+1, e2n, and e2n+1 include main samples and extra samples with the first attribute and other two-pair samples S2n, S2n+1, e2n, and e2n+1 are main samples with the second attribute. On the whole, four-pair samples are fundamental. Extra samples e2n, e2n+1 with the first attribute are extra samples with the second attribute.

Specifically, the data structure of FIG. 15 is such that the signals in the first channel group, at least two of the channels, are sampled at the first frequency and the signals in the second channel group, other channels, are sampled at the second frequency. Furthermore, the sample data is divided into an m1-bit main word on the MSB side and an m2-bit extra word on the LSB side.

Then, the main words in the 2n-th sample data items of the individual channels in the first channel group are put together into main sample S2n, the main words in the 2n+1-th sample data items of the individual channels in the first channel group are put together into main sample S2n+1, the extra words in the 2n-th sample data items of the individual channels in the first channel group are put together into extra sample e2n, and the extra words in the 2n+1-th sample data items of the individual channels in the first channel group are put together into extra sample e2n+1. These samples are arranged in that order.

After this arrangement, the main words in the 2n-th sample data items of the individual channels in the second channel group are put together into main sample S2n, the main words in the 2n+1-th sample data items of the individual channels in the second channel group are put together into main sample S2n+1, the extra words in the 2n-th sample data items of the individual channels in the second channel group are put together into extra sample e2n, and the extra words in the 2n+1-th sample data items of the individual channels in the second channel group are put together into extra sample e2n+1, where n=0, 1, 2, . . . . These samples are arranged in that order.

Figure 16:
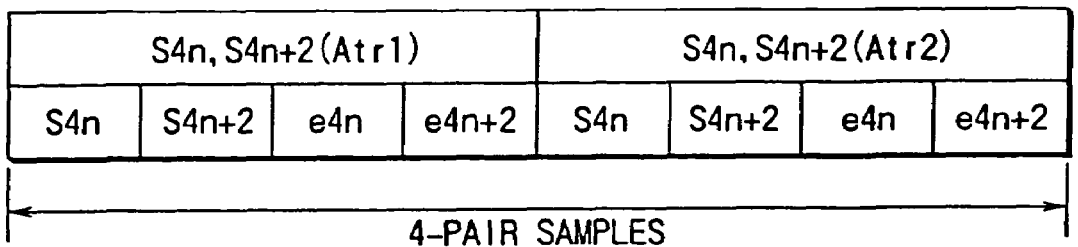
FIG. 16 is a diagram to help explain still another example of the data sample structure associated with the present invention.

The data structure of FIG. 16 corresponds to case 3 of FIG. 13. In FIG. 16, the sampling frequency fs is 48 kHz and the number of quantization bits Qb is 16 for the attribute Atrt1 in the first channel group and the sampling frequency fs is 48 kHz and the number of quantization bits Qb is 16 for the attribute Atrt2 in the second channel group.

In this case, S4n and S4n+2 are main samples with the first attribute, e4n and e4n+2 are extra samples with the first attribute, S4n and S4n+2 are main samples of the second attribute, and e4n and e4n+2 are extra samples with the second attribute. In the first and second channel groups, two-pair samples are fundamental. On the whole, four-pair samples are fundamental.

Specifically, the data structure of FIG. 16 is such that the signals in the first channel group, at least two of the channels, are sampled at the first frequency and the signals in the second channel group, other channels, are sampled at the second frequency. Furthermore, the sample data is divided into an m1-bit main word on the MSB side and an m2-bit extra word on the LSB side.

Then, the main words in the 4n-th sample data items of the individual channels in the first channel group are put together into main sample S4n, the main words in the 4n+2-th sample data items of the individual channels in the first channel group are put together into main sample S4n+2, the extra words in the 4n-th sample data items of the individual channels in the first channel group are put together into extra sample e4n, and the extra words in the 4n+2-th sample data items of the individual channels in the first channel group are put together into extra sample e4n+2. Those samples are arranged in that order.

After this arrangement, the main words in the 4n-th sample data items of the individual channels in the second channel group are put together into main sample S4n, the main words in the 4n+2-th sample data items of the individual channels in the second channel group are put together into main sample S4n+2, the extra words in the 4n-th sample data items of the individual channels in the second channel group are put together into extra sample e4n, and the extra words in the 4n+2-th sample data items of the individual channels in the second channel group are put together into extra sample e4n+2, where n=0, 1, 2, . . . . Those samples are arranged in that order.

Figure 17:
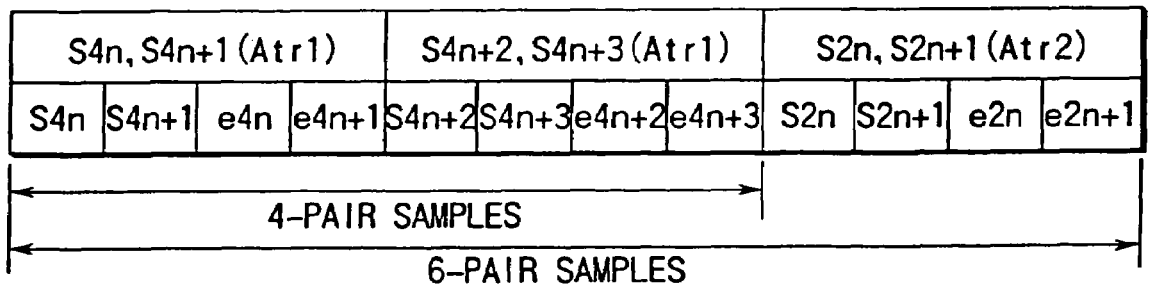
FIG. 17 is a diagram to help explain still another example of the data sample structure associated with the present invention.

The data structure of FIG. 17 corresponds to case 1 of FIG. 11. In this case, however, the number of quantization bits Qb in the first channel group is made different from that in the second channel group. Specifically, in FIG. 17, the sampling frequency fs is 96 kHz and the number of quantization bits Qb is 20 for the attribute Atrt1 in the first channel group and the sampling frequency fs is 48 kHz and the number of quantization bits Qb is 24 for the attribute Atrt2 in the second channel group. Furthermore, the data structure is based on the scalable method and resembles the DVD video sample arrangement structure.

Specifically, four samples S4n, S4n+1, S4n+2, and S4n+3 are main samples with the first attribute and two samples S2n and S2n+1 are main samples with the second attribute. In this case, extra samples e4n, e4n+1, e4n+2, and e4n+3 are present in the first channel group, and extra samples e2n and e2n+1 are present in the second channel group. In this case, too, four-pair samples are fundamental in the first channel group. In the corresponding second channel group, two-pair samples are fundamental. On the whole, six-pair samples are fundamental.

With the above data structure, it is possible to obtain a DVD audio data structure complying with high-sound-quality audio signal specifications and fulfilling a specific transfer rate, while leaving the type of the DVD video audio data structure as much as possible.

The present invention provides a characteristic data structure and is particularly characterized in that the sampling frequency fs in one of the two attributes is a multiple of the sampling frequency fs of the other. If only either the number of channels N or the number of quantization bits Qb differs between the two attributes, use of the concept of the DVD video standard makes it possible to deal with a data structure differing in the number of channels N or the number of quantization bits Qb.

For example, in the data structures shown in FIGS. 4A and 4B, the number of channels N or the number of quantization bits Qb in the attribute information in the data item following the main sample section and extra sample section is changed and recorded.

The present invention further includes the following concept in the above data structure. FIG. 11 shows the correspondence in synchronizing time between each sample in the first channel group with the first attribute Art1 and each sample in the second channel group with the second attribute Art2, using reference symbols 4n, 4n+1, 4n+2, 4n+3, and 2n, 2n+1.

Figure 18:
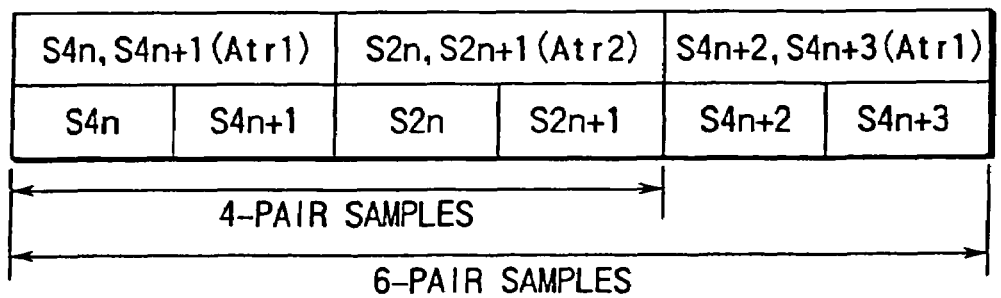
FIG. 18 is a diagram to help explain still another example of the data sample structure associated with the present invention.

As seen from the figure, four samples form a set. Thus, four samples are treated as a set. As shown in FIG. 18, two samples S4n and S4n+1 with the first attribute Art1 and two samples S2n and S2n+1 with the second attribute Art2 may be arranged consecutively, followed by two samples S4n+2 and S4n+3 with the first attribute Art1. This data structure corresponds to a modification of the data structure of FIG. 14.

Figure 19:
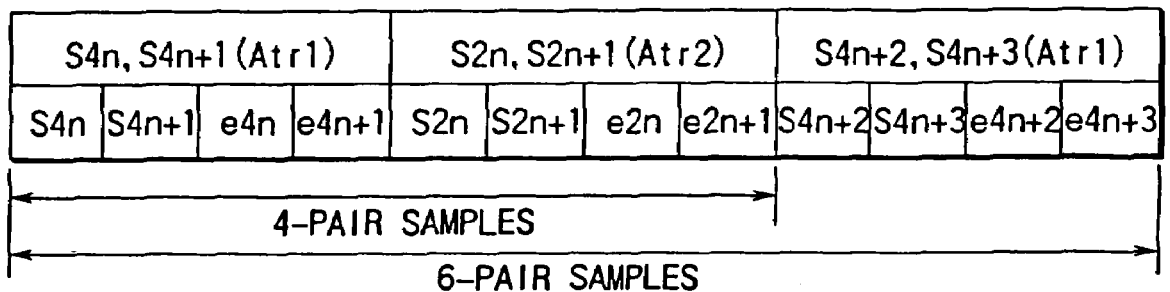
FIG. 19 is a diagram to help explain still another example of the data sample structure associated with the present invention.

FIG. 19 shows another example of the data structure. The data structure corresponds to a modification of the data structure of FIG. 16. Specifically, four samples S4n, S4n+1, S4n+2, and S4n+3 are main samples with the first attribute and two samples S2n and S2n+1 are main samples with the second attribute.

In this case, extra samples e4n, e4n+1, e4n+2, and e4n+3 are present in the first channel group and extra samples e2n and e2n+1 are present in the second channel group. In this case, too, for-pair samples are fundamental in the first channel group. In the corresponding second channel group, two-pair samples are fundamental. On the whole, six-pair samples are fundamental.

In the data structure, S4n, S4n+1, e4n, e4n+1 in the first channel group and S2n, S2n+1, e2n, e2n+1 in the second channel group are put together into a four-pair sample. After this, two-pair samples S4n+2, S4n+3, e4n+2, and e4n+3 in the first channel group are arranged.

The unit of sample can also be understood as follows. When the sampling frequency fs of the first attribute Atri1 is the same as that of the second attribute Atri2 (for example, as in the cases of FIGS. 12 and 13 and FIGS. 15 and 16), the number of samples after the same time has passed is the same between the channel group on the first attribute Atr1 side and the channel group on the second attribute Atr2 side. In this case, the data may be acquired in units of two samples as in the DVD video standard.

Furthermore, the data structure of the present invention can also be understood as follows. The number of samples forming a set, or a unit, is basically 2, 4, or 6. To give flexibility, 12 samples, the least common multiple of 2, 4, and 6, or 12-pair samples may be used as a unit and the data be handled in units of 12 samples or 12-pair samples.

As described above, the number of samples forming a unit may vary from case to case. In each of the cases, however, the data is filled in the data area of an audio pack in units of samples. When the remaining part of the audio pack falls short of one unit, stuffing bytes or padding packets are stuffed as in the video standard.

Figure 20:
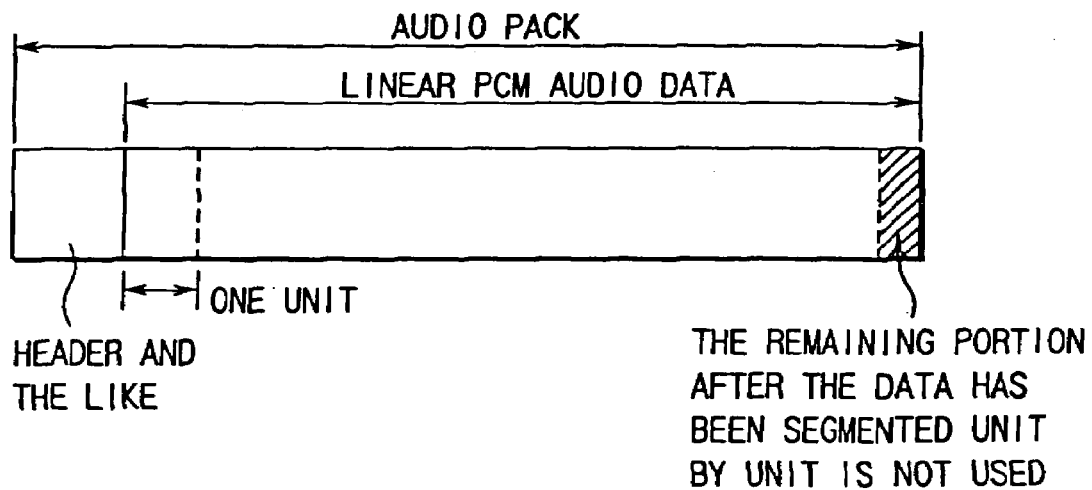
FIG. 20 is a simplified diagram to help explain the internal structure of an audio pack related to the present invention.

FIG. 20 shows a case where a padding packet is inserted because an area (the shaded portion) smaller than one unit has occurred. An area smaller than one unit means an area with the amount of data items equal to or fewer than a specific number of samples or a specific number of pair samples. A specific number of samples or a specific number of pair samples is 2, 4, 6, or 12. The audio pack contains 2048 bytes and is designed to necessarily have a presentation time stamp PTS.

The data arrangement of the first attribute Art1 and that of the second attribute Art2 are not restricted to those. For instance, the data may be arranged in reverse. The arrangement may be changed according to the decision.

While in the explanation, 96 kHz and 48 kHz have been used as the sampling frequency fs, the present invention is not limited to these. For instance, 88.2 kHz and 44.1 kHz may be used. The present invention may be applied to a pair of sampling frequencies one of which is twice the other. To give flexibility, a pair of sampling frequencies fs may be such that one sample frequency is an integral multiple of the other. The invention is applied easily to this pair.

In the explanation, two types of channel attributes have been used in one stream. The present invention may be applied to a stream in which three or more types of channel attributes are used.

In the explanation, the data structure has been explained. The present invention may be applied to a recording medium having the above data structure, a method of and apparatus for recording data on the recording medium, a method of and apparatus for reproducing the data from the recording medium, and a data transfer method.

Next, the relationship between the overall data structure of an optical disk on which DVD audio information is recorded and the aforementioned audio packs will be explained briefly.

Figure 21:
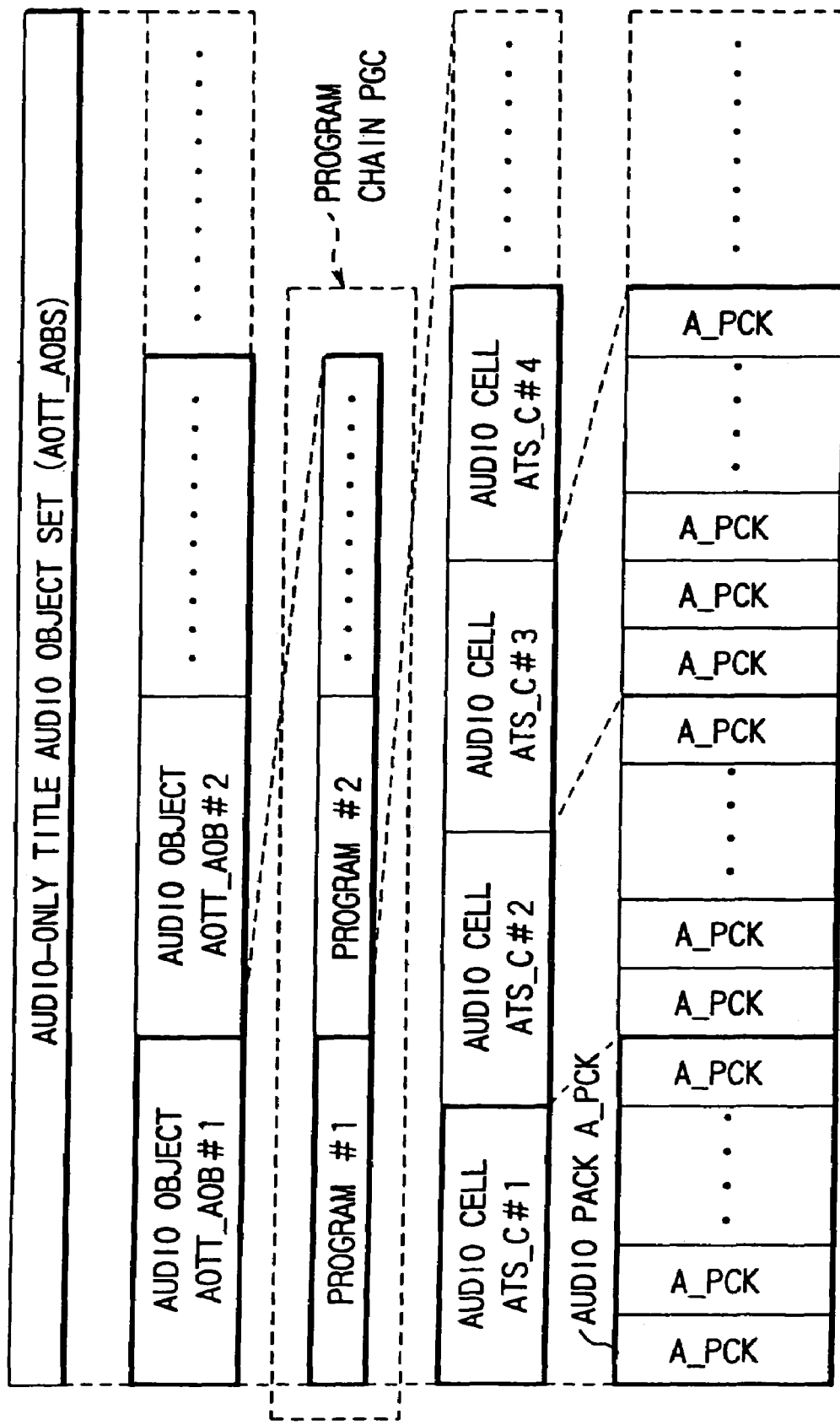
FIG. 21 is a hierarchical diagram to help explain the relationship between an audio object set and audio packs in connection with the present invention.

FIG. 21 shows an example of the data structure of the contents (audio-only title audio object set AOTT_AOBS) recorded in a DVD audio zone.

AOTT_AOBS defines a set of one or more audio objects AOTT_AOB #n. Each AOTT_AOB defines a set of one or more audio cells ATS_C #n. A set of one or more ATS_C #n forms a program. A set of one or more programs forms a program chain PGC. The PGC form a logical unit to indicate all of or part of the audio title.

In the example, each audio cell ATS_C # is composed of a set of 2048-byte audio packs A_PCK. These packs makes the minimum unit in performing a data transfer process. The minimum unit in logical processing is a cell. Logical processing is effected in cells.

Figure 22:
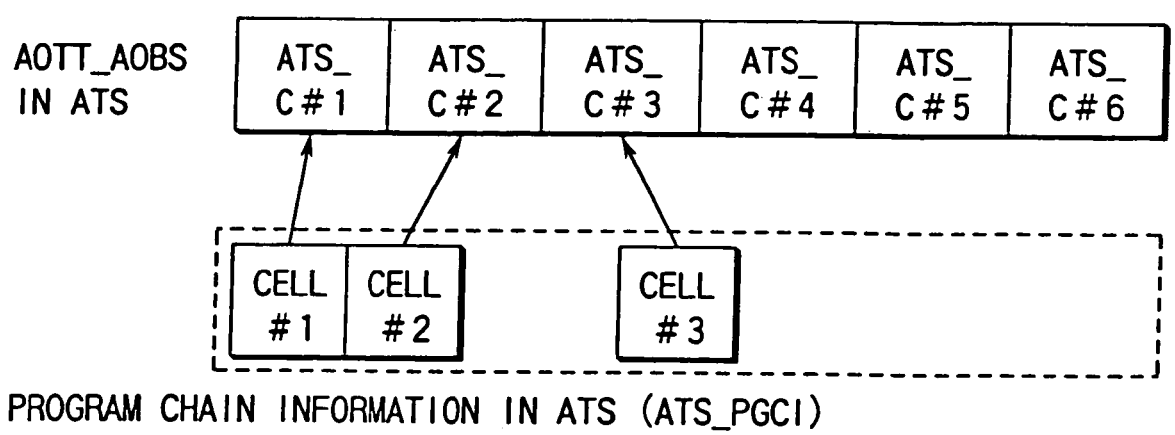
FIG. 22 is a diagram to help explain the relationship between the cells in an audio title set and program chain information in connection with the present invention.

FIG. 22 is a diagram to help explain a case where a cell is accessed by using program chain information ATS_PGCI in the DVD audio zone. Specifically, on the basis of cell playback information on program #1 in ATS_PGCI, cell ATS_C #1 and ATS_C #2 in AOB are reproduced.

When one PGC is compared to an opera, cells constituting the PGC corresponds to various music scenes or singing senses in the opera. The contents of the PGC (or the contents of the cell) are determined by a software provider that creates the contents recorded on a disk. Specifically, the provider can reproduce the cells constituting AOTT_AOBS as it has planned, using cell playback information ATS_C_PBI written in program chain information ATS_PGCI in ATS.

Following is an explanation of how various decisions in the first and second channel groups are made in management data.

Figure 23:
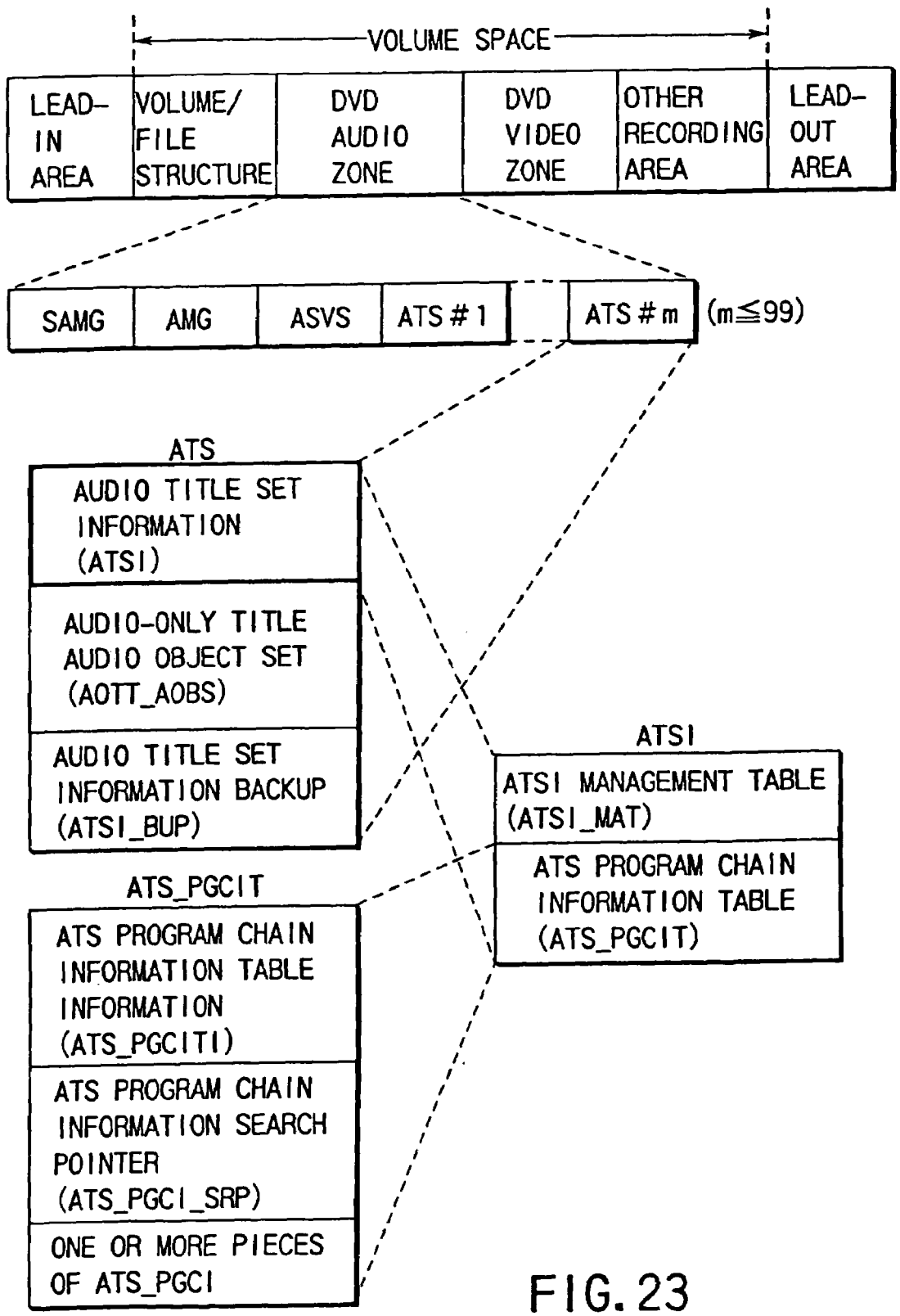
FIG. 23 is a diagram to explain the arrangement of logical data items on a disk on which DVD audio related to the present invention has been recorded.

FIG. 23 is a diagram to help explain the contents recorded in the audio title set ATS in a DVD audio zone. The audio title set ATS is composed of audio title set information ATSI, audio-only title audio object set AOTT_AOBS, and audio title set information backup ATSI_BUP.

Audio title set information ATSI includes an audio title set information management table ASI_MAT and an audio title set program chain information table ATS_PGCIT.

The audio title set program chain information table ATS_PGCIT includes audio title set program chain information table information ATS_PGCITI, an audio title set program chain information search pointer ATS_PGCI_SRP, and one or more pieces of audio title set program chain information ATS_PGCI.

FIG. 24 lists the contents recorded in the audio title set information management table ATSI_MAT of FIG. 23. Specifically, in the audio title set information management table ATSI_MAT, the following are provided: an audio title set identifier ATSI_ID, the end address ATS_EA of the audio title set, the end address ATSI_EA of audio title set information, the version number VERN of the audio standard employed, the end address ATSI_MAT_EA of the audio title set information management table, the start address VTS_SA of the audio-only title AOTT video title set VTS, the start address AOTT_AOBS_SA of the audio-only title audio object set or the start address AOTT_VOBS_SA of the audio-only title video object set, the start address ATS_PGCIT_SA of the audio title set program chain information table, the attribute AOTT_AOBS_ATR of the audio-only title audio object set or the attributes AOTT_VOBS_ATR #0 to #7 of the audio-only title video object set, audio title set data mixing coefficients ATS_DM_COEFT #0 to #15, and other reserved areas.

In the start address VTS_SA of the audio-only title AOTT video title set VTS, the start address of a video title set VTS including VTSTT_VOBS used for AOTT is written, when ATS does not have AOTT_AOBS. When ATS has AOTT_AOBS, "00000000h" is written in VTS_SA. The reason is that video information may also be recorded.

In the AOTT_AOBS_SA, the start address of AOTT_AOBS is written in the number of relative logical blocks counted from the first logical block in ATS, when ATS has AOTT_AOBS. On the other hand, when ATS does not have AOTT_AOBS, the start address of the video object set VTSTT_VOBS for the video title set is written in AOTT_VOBS_SA in the number of relative logical blocks counted from the first logical block in the VTS including the VTSTT_VOBS used for ATS.

In the ATS_PGCIT_SA, the start address of ATS_PGCIT is written in the number of relative logical blocks counted from the first logical block of ATSI.

Eight attribute information for the audio title set AOTT_AOB_ATR #0 to #7 or attribute information for the video title set AOTT_VOB_ATR #0 to #7 are prepared. When ATS has AOTT_AOBS, the attribute for AOTT_AOB recorded in ATS is written in AOTT_AOB_ATR.

On the other hand, when ATS has no AOTT_AOBS, the attribute for an audio stream in VOB used for AOTT_VOB in ATS is written in AOTT_VOB_ATR. In the AOTT_AOB_ATR or AOTT_VOB_ATR, the employed sampling frequency fs (44 to 192 kHz) and the number of quantization bits Qb (16 to 24 bits) are written.

Furthermore, in the section, a channel assignment is written. In the channel assignment, allocation information on the individual channel in the audio stream included in the video object specified by the attribute is written. The contents of the allocation information correspond to the structure of the multichannel. The channel allocation information will be explained later. The allocation information is also written in an audio packet header explained later.

The ATS_DM_COEFT indicates a coefficient used in mixing down the audio data having multichannel output, such as DTS (Decoding Time Stamp) or AC-3, into two-channel output and is used in only one or more AOTT_AOB recorded in ATS.

When ATS has no AOTT_AOBS, "0h" is written in all the bits in each of 16 ATS_DM_COEFT (#0 to #15). The area for the 16 ATS_DM_COEFT (#0 to #15) is provided constantly.

Figure 25:
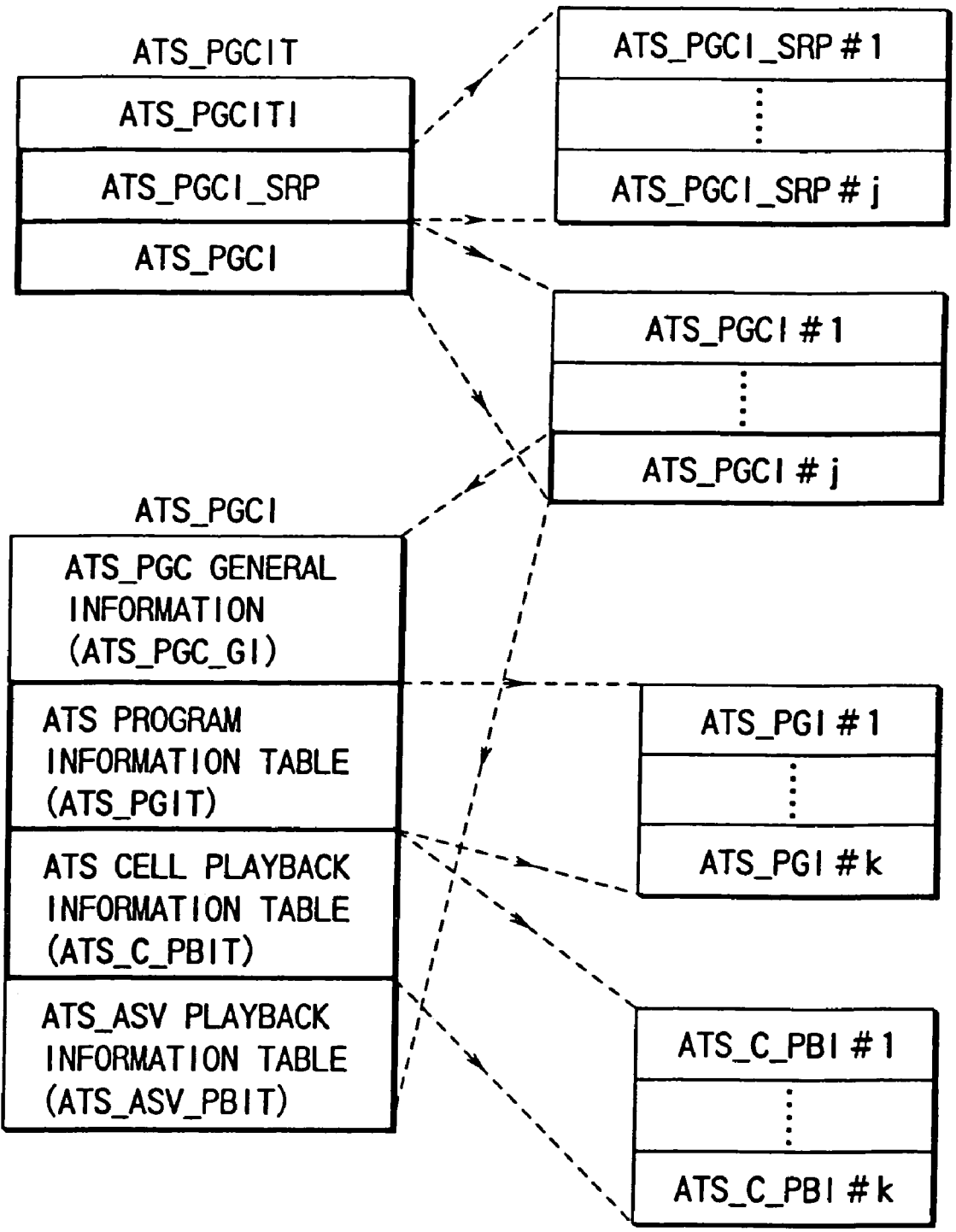
FIG. 25 is a diagram to help explain pieces of information constituting the audio title set program chain information search pointer shown in FIG. 23.

FIG. 25 is a diagram to help explain the contents of audio title set program chain information table ATS_PGCIT included in audio title set information ATSI. The recording position of ATS_PGCIT is written in ATS_PGCIT_SA of ATSI_MAT.

The ATS_PGCIT includes an audio title set program chain information table information ATS_PGCITI, an audio title set program chain information search pointer ATS_PGCI_SRP, and audio title set program chain information ATS_PGCI.

The ATS_PGCI_SRP includes one or more audio title set program chain information search pointers ATS_PGCI_SRP #1 to ATS_PGCI_SRP #j. The ATS_PGCI includes as many pieces of audio title set program chain information ATS_PGCI #1 to ATS_PGCI #j as ATS_PGCI_SRP #1 to ATS_PGCI_SRP #j.

Each ATS_PGCI functions as navigation data to control the playback of the audio title set program chain ATS_PGC.

ATS_PGC, which is a unit used to define audio-only title AOTT, is composed of ATS_PGCI and one or more cells (cells in AOTT_AOBS or cells in ATOTT_VOBS used as an object of AOTT).

Each ATS_PGCI includes general information on audio title set program chains ATS_PGC_GI, an audio title set program information table ATS_PGIT, an audio title set cell playback information table ATS_C_PBIT, and an audio title set audio still video playback information table ATS_ASV_PBIT.

The ATS_PGIT includes one or more pieces of audio title set program information ATS_PGI #1 to ATS_PGI #k. The ATS_C_PBIT includes as many pieces of audio title set cell playback information ATS_C_PBI #1 to ATS_C_PBI #k as ATS_PGI #1 to ATS_PGI #k.

FIG. 26 is a table listing the channel allocation information and the classes of the first channel group and second channel group classified on the basis of the channel allocation information. In the ATSI_MAT of FIG. 24, attribute information on the audio object is written. In the attribute information, a channel assignment is present. The data shown in FIG. 26 is the channel assignment.

When the channel allocation information is 00000b, this means monaural; when it is 00001b, this means L and R (stereo) channels are present in the first channel group; and when it is 00010b, this means Lf and Rf (left front and light front) channels are present in the first channel group and S (surround) is present in the second channel group.

When the channel allocation information is 00011b, this means Lf and Rf channels are present in the first channel group and Ls and Rs (left surround and right surround) are present in the second channel group. When it is 00100b, this means Lf and Rf channels are present in the first channel group and LFE (low-frequency-band effect) is present in the second channel group.

When the channel allocation information is 00101b, this means Lf and Rf channels are present in the first channel group and LEF and S are present in the second channel group. When it is 00110b, this means Lf and Rf channels are present in the first channel group and LFE, Ls, and Rs are present in the second channel group.

When the channel allocation information is 00111b, this means Lf and Rf channels are present in the first channel group and C (center) is present in the second channel group. When it is 01000b, this means Lf and Rf channels are present in the first channel group and C and S are present in the second channel group.

When the channel allocation information is 01001b, this means Lf and Rf channels are present in the first channel group and C, Ls, and Rs are present in the second channel group. When it is 01010b, this means Lf and Rf channels are present in the first channel group and C and LFE are present in the second channel group.

When the channel allocation information is 0101b, this means Lf and Rf channels are present in the first channel group and C, LFE, and S are present in the second channel group. When it is 01100b, this means Lf and Rf channels are present in the first channel group and C, LFE, Ls, and Rs are present in the second channel group.

When the channel allocation information is 01101b, this means Lf and Rf channels and C are present in the first channel group and S is present in the second channel group. When it is 10000b, this means Lf and Rf channels and C are present in the first channel group and Ls and Rs are present in the second channel group.

When the channel allocation information is 01101b, this means Lf and Rf channels and C are present in the first channel group and LFE is present in the second channel group. When it is 10000b, this means Lf and Rf channels and C are present in the first channel group and LEF and S are present in the second channel group.

When the channel allocation information is 10001b, this means Lf and Rf channels and C are present in the first channel group and LFE, Ls, and Rs are present in the second channel group. When it is 10010b, this means Lf and Rf channels, Ls, and Rs are present in the first channel group and LFE is present in the second channel group.

When the channel allocation information is 10011b, this means Lf and Rf channels, Ls, and Rs are present in the first channel group and C is present in the second channel group. When it is 10100b, this means Lf and Rf channels, Ls, and Rs are present in the first channel group and C and LFE are present in the second channel group.

In the attribute information of FIG. 24, or AOTT_AOB_ATR or AOTT_VOB_ATR, the sampling frequency fs (44 to 192 kHz) and the number of quantization bits Qb (16 to 24 bits) employed are written.

Figure 27:
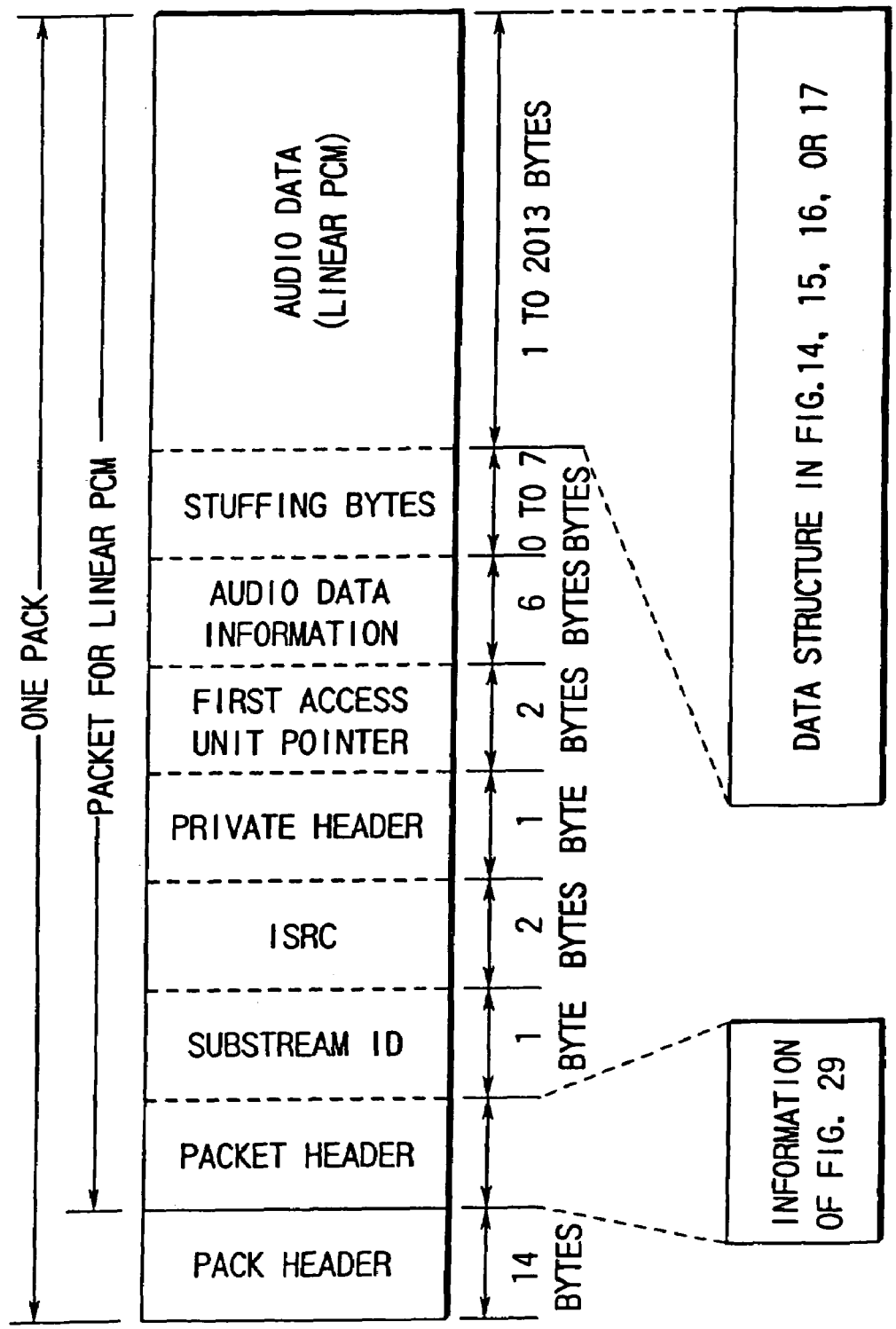
FIG. 27 is a diagram to help explain the internal structure of an audio pack related to the present invention.

Next, an audio pack will be explained in further detail. FIG. 27 shows the basic structure of an audio pack A_PKT. Specifically, in A_PKT, areas are set for the following: a pack header, a packet header, a substream ID, ISRC (International Standard Recording Code), a private header length, a first access unit pointer, audio data information, 0 to 7 stuffing bytes, and linear PCM audio data.

The following rule is applied to the size of the packet header. Specifically, when A_PKT is the first packet in an audio object, the size is 17 bytes long. When it does not include the first data item of the audio frame, the size is nine bytes long. When it includes the first data item, the size is 14 bytes long.

A linear PCM audio packet is composed of a packet header, a private header, and audio data. The contents of the packet header and that of the private header are shown in FIGS. 28A, 28B, and 29.

FIGS. 28A and 28B show a packet header. Data items are described in this order: packet start code, stream id, PES packet length, "01", PES scramble control information, PES priority, data arrangement indicator, copyright, original or copy, PTS_DTS flag, ESCR_flag, ES_rate flag, DSM trick mode flag, additional copy flag, PES_CRC flag, PES expanded flag, and PES flag length.

After these, five bytes are secured for an area in which a presentation time stamp PTS indicating the playback time of the packet is to be written. Then, the following are written in this order: a PES private data flag, a pack header field flag, a program packet sequence counter flag, a P_STD buffer flag, a second PES expanded flag, "01", a P_STD buffer scale, and P_STD buffer size information.

FIG. 29 shows a private packet. Data items are described in this order: a substream id, reserved, an ISRC number, ISRC data, a private header length, a head access unit pointer, an audio emphasizing flag, reserved, reserved, a downmix code, a first number of quantization bits, a second number of quantization bits, a first audio sampling frequency, a second audio sampling frequency, reserved, a multichannel type, reserved, channel assignment, dynamic range control information, and stuffing bytes.

Explanation of the individual field items will be given. In the substream id, 10100000b indicating linear PCM audio data is written. In the ISRC number used for still picture control, a number in the range from 1 to 12 indicating the range of the recorded ISRC data is written. In the ISRC data, the data specified by the ISRC number is written.

The private header length is expressed by the number of logical blocks counted from the last byte in the filed. In the access unit pointer at the head of the field, the address of the begin byte of a unit to be accessed first is expressed in the number of logical blocks from the last byte in the field.

In the audio emphasizing flag, emphasis off is written when the first sampling frequency fs is 96 kHz or 88.2 kHz. Emphasis off is also written when the second sampling frequency fs is 96 kHz or 88.2 kHz. A 0 is written for emphasis off and a 1 is written for emphasis on. In the downmix code, a coefficient table for downmixing audio samples is specified. The table number is in the range from 0000b to 1111b.

In the first number of quantization bits Qb, the number of bits in quantized audio samples in the first channel group is written. When it is 0000b, this means 16 bits; when it is 0001b, this means 20 bits; and when it is 0010b, this means 24 bits.

In the second number of quantization bits Qb, the number of bits in quantized audio samples in the second channel group is written. When it is 0000b, this means 16 bits; when it is 0001b, this means 20 bits; and when it is 0010b, this means 24 bits. When it is 1111b, this means that the number of bits has not been determined. For example, it happens when the second channel group does not exist.

In the first audio sampling frequency, the sampling frequency fs of an audio signal in the first channel group is written. When it is 0000b, this means 48 kHz; when it is 0001b, this means 96 kHz; when it is 1000b, this means 44.1 kHz, and when it is 1001b, this means 88.2 kHz.

In the second audio sampling frequency, the sampling frequency fs of an audio signal in the second channel group is written. When it is 0000b, this means 48 kHz; when it is 0001b, this means 96 kHz; when it is 1000b, this means 44.1 kHz, and when it is 1001b, this means 88.2 kHz. When it is 1111b, this means that the sampling frequency fs has not been determined. For example, it happens when the second channel group does not exist.

In the multichannel type, the type of the multichannel structure of an audio sample is written. When it is 0000b, this means type 1, and when it is not 0000b, this means reserved. In the channel assignment, the channel allocation state is written as described in FIG. 26.

The dynamic range control information is used to suppress the dynamic range. The three leftmost bits in the eight-bit word indicate integer X and the remaining five bits indicate integer Y.

The linear gain is $G=2^{4-}[(X+Y)/30]$ ($0 \leq X \leq 7$, $0 \leq Y \leq 29$). In dB, it is $G=24.082-6.0206X-0.2007Y$ ($0 \leq X \leq 7$, $0 \leq Y \leq 29$).

In disk playback, a system control section grasps the attribute information indicating, for example, the allocation of channel groups, the first number of quantization bits and the second number of quantization bits in the audio data, and the first and second audio sampling frequencies, thereby not only enabling the data in the first and second channel groups to be segmented but also synchronizing the playback timing. Thus, these pieces of header information can be used as synchronizing information.

Figure 30:
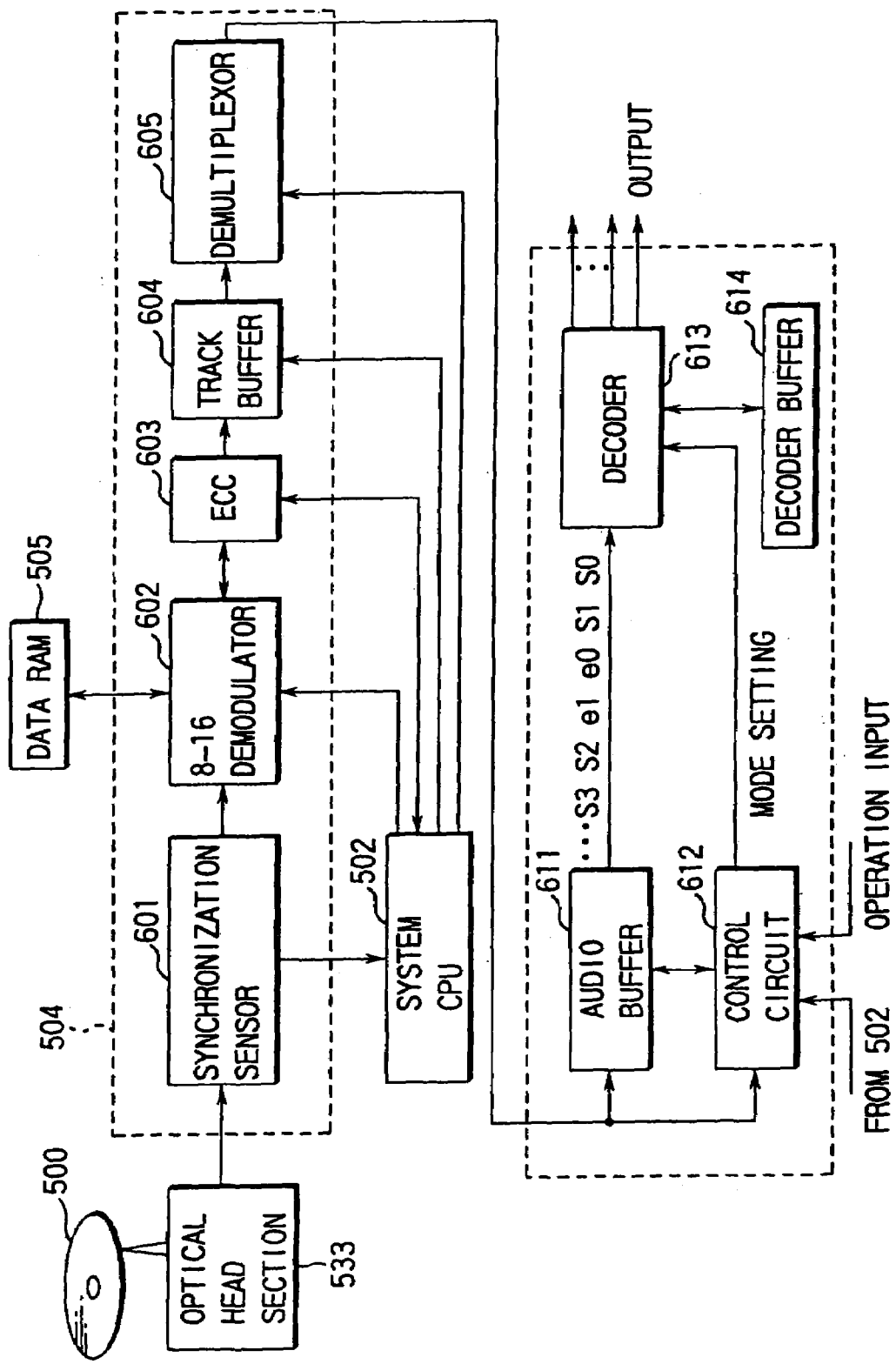
FIG. 30 is a block diagram showing the configuration of a disk reproducing apparatus according to the present invention.

The reproducing system for a DVD audio disk on which data has been recorded as described above will be explained in detail. FIG. 30 shows the signal route of the reproducing apparatus concerning audio streams. The data recorded on an optical disk 500 is read by an optical head section 533, which outputs a high-frequency signal.

The high-frequency signal (readout signal) inputted to a system processing section 504 is inputted to a synchronization sensor 601. The synchronization sensor 601 senses the synchronizing signal added to the recorded data and generates a timing signal. The readout signal from which the synchronizing signal has been removed at the synchronization sensor 601 is inputted to a 8-16 demodulator 602, which demodulates a 16-bit signal into an 8-bit signal. The 8-16 demodulator 602 demodulates the readout signal into an 8-bit data string.

The demodulated data is inputted to an error correction circuit 603, which performs an error correcting process. The error-corrected data is inputted to a demultiplexor 605 via a track buffer 604. The demultiplexor 605 identifies an audio pack, a real time pack, and the like on the basis of the stream ID and outputs each pack to the corresponding decoder.

The audio pack is loaded into an audio buffer 611. The pack header and packet header in an audio pack are read by a control circuit 612. The control circuit 612 recognizes the contents of the audio pack. Specifically, the control circuit 612 recognizes the start code of the audio pack, the stuffing length, the packet start code, and the stream ID. It further recognizes the packet length, the substream ID, the first access point, the number of audio quantization bits, the sampling frequency, and the channel groups from the channel assignment.

Recognizing such pieces of information, the control circuit 612 can recognize the contents of the linear PCM data packets and determine a decoding method. Furthermore, the control circuit 612 can grasp the segmentation address for the playback audio data in the packet stored in the audio buffer 611.

As a result, under the control of the control circuit 612, the audio buffer 611 outputs the aforementioned samples, for example, S0, S1, e0, e1, S2, S3, . . . to the decoder 613. The control circuit 612 recognizes at least the number of quantization bits, the sampling frequency, and channel assignment. On the basis of the recognized pieces of information, the data can be segmented and the decode mode be set in the decoder 613. The samples are supplied to the decoder 613 that performs a channel process and decodes the data.

Figure 31:
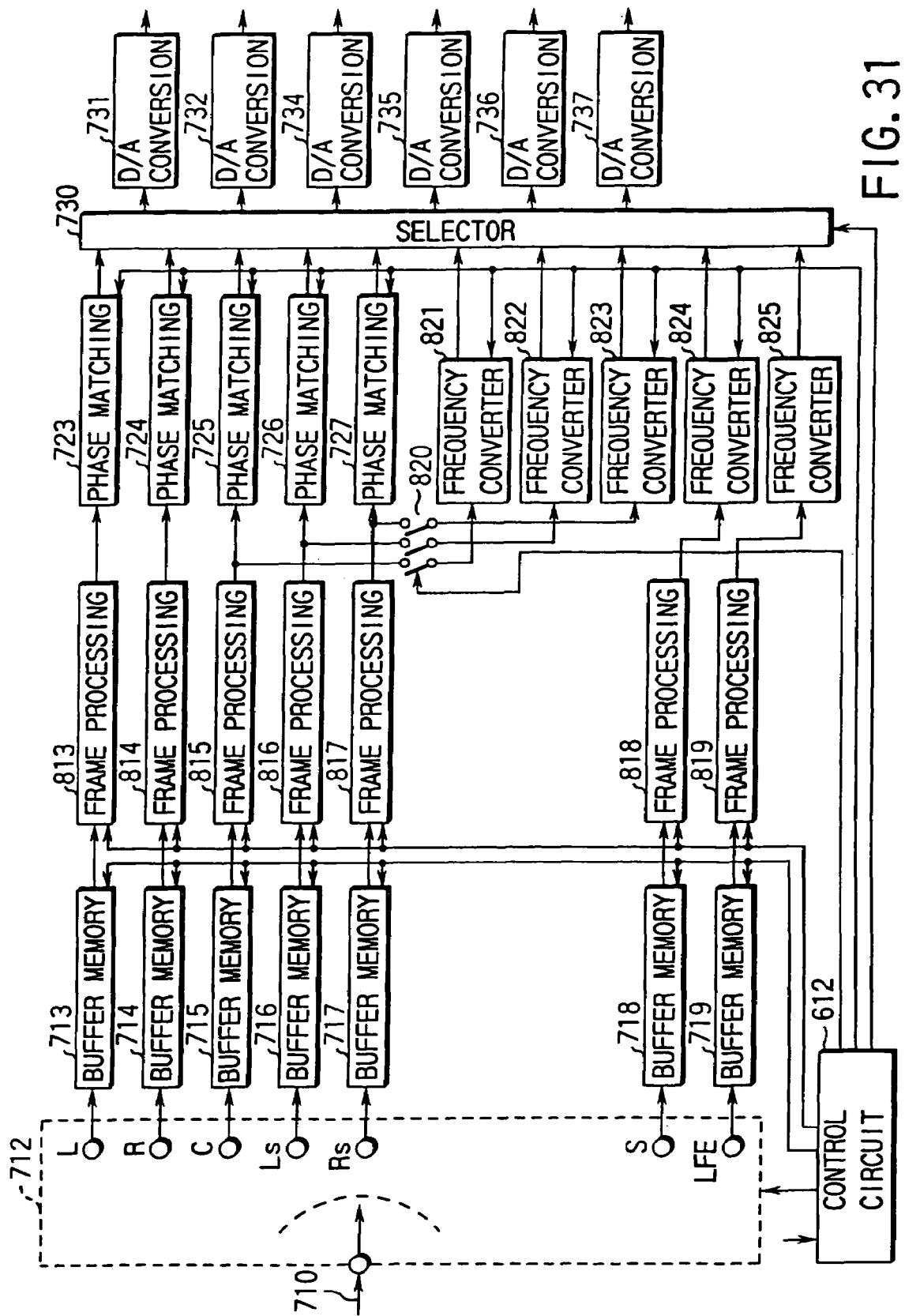
FIG. 31 is a block diagram showing the internal configuration of the decoder in the disk reproducing apparatus according of FIG. 30.
Figure 32A:
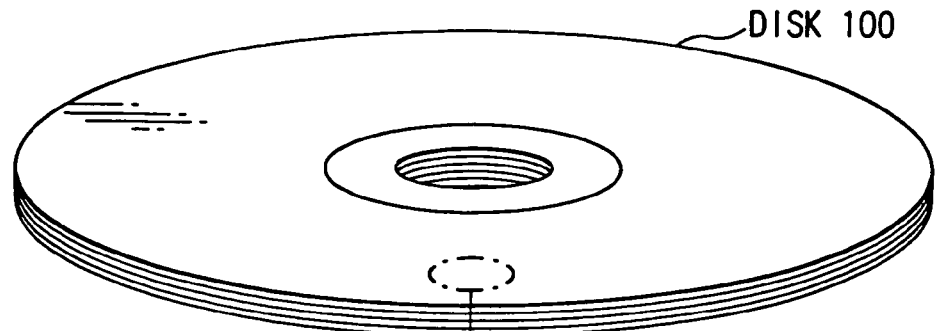
FIGS. 32A to 32D illustrate a disk, pit trains, sector trains, and a physical sector, respectively.
Figure 32B:
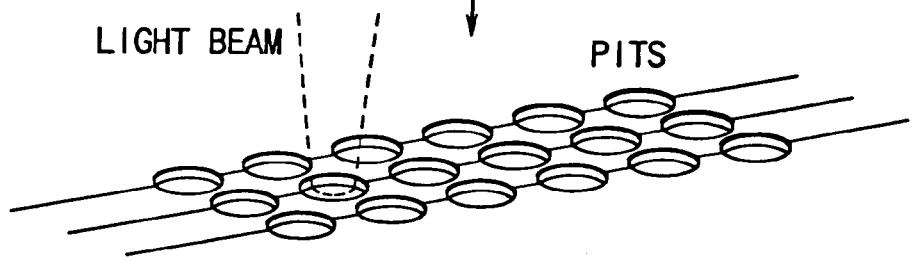
Figure 32C:
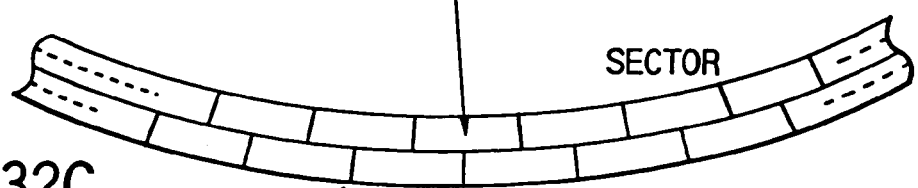
Figure 32D:
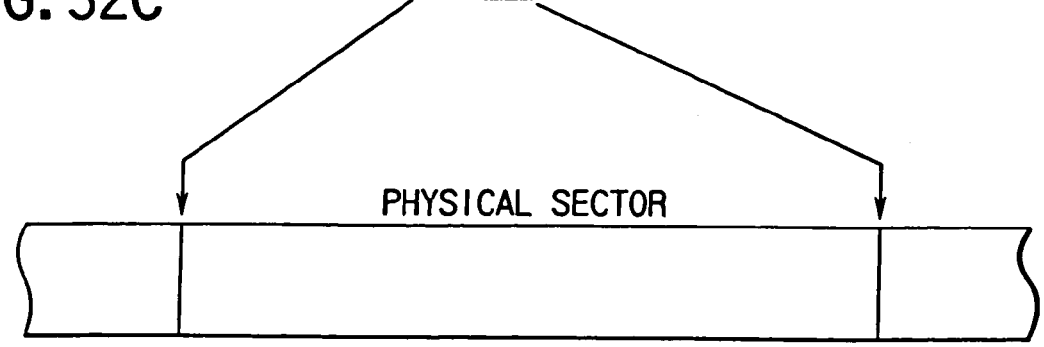

FIG. 31 shows an example of the configuration of the decoder 613. The sample supplied to an input terminal 710 is allocated channel by channel with a switch 712 under the control of the control circuit 612. Specifically, when signal L or Lf (including an extra word) has arrived, it is allocated to a buffer memory 713; when signal R or Rf (including an extra word) has arrived, it is allocated to a buffer memory 714; when signal C (including an extra word when it has also arrived) has arrived, it is allocated to a buffer memory 715; when signal Ls (including an extra word when it has also arrived) has arrived, it is allocated to a buffer memory 716, and when signal RS (including an extra word when it has also arrived) has arrived, it is allocated to a buffer memory 717. Furthermore, when signal S has arrived, it is allocated to a buffer memory 718, and when signal LEF has arrived, it is allocated to a buffer memory 719.

The outputs of the individual buffer memories 713 to 719 are inputted to frame processing sections 813 to 819 respectively, which forms a frame unit. The outputs of the frame processing sections 813, 814, 815, 816, and 817 are supplied to phase matching sections 723, 724, 725, 726, and 727 respectively.

The outputs of the frame processing sections 815, 816, and 817 may be supplied to frequency converters 821, 822, and 823, respectively, via a switch 820. The outputs of the frame processing sections 818 and 819 are supplied to frequency converters 824 and 825 respectively.

The phase matching sections 723 to 727 are for finally matching the phase of a signal in the first channel group with a signal in the second channel group, while the second channel is being frequency-converted. The outputs of the phase matching sections 723 to 727 and those of the frequency converters 821 to 825 are supplied to a selector 730.

As shown in FIG. 26, the selector 730 selects the corresponding channel signals according to the information in the channel assignment and supplies the selected signals to the corresponding digital/analog converters 731, 732, 733, 734, 735, and 736, respectively.

While in the embodiment, a sample in the second channel group has been frequency-converted and outputted, it may be converted into an analog signal without frequency conversion. In this case, the phase matching section in the first channel group may be eliminated.

Next, the way of the above-described audio information being recorded on an optical disk will be explained briefly. As shown in FIGS. 32A to 32D, when part of the recording side of an optical disk 100 is enlarged, it can be seen that pit trains have been formed. A set of pits forms a sector. On the tracks of the optical disk 100, sector trains are formed. The sectors are read by an optical head consecutively, thereby reproducing audio packs in real time.

Figures 33A, 33B:
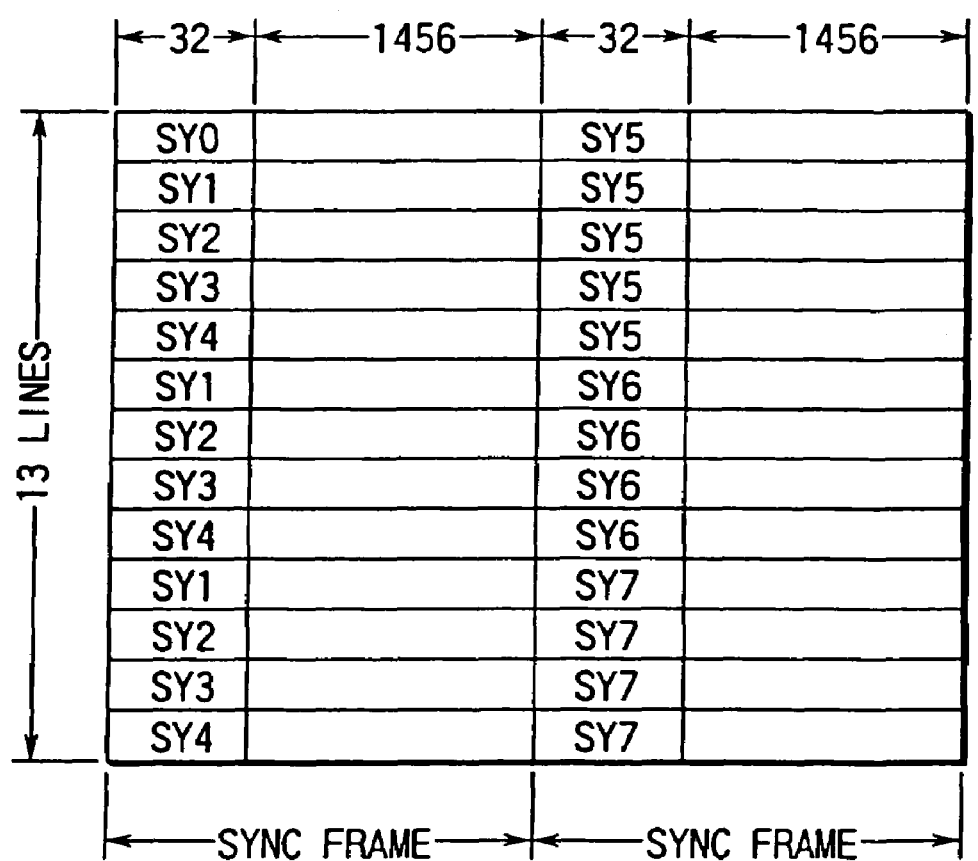
FIGS. 33A and 33B are diagrams to help explain the contents of a physical sector.

Following is an explanation of one sector, for example, a sector in which audio information has been written. As shown in FIGS. 33A and 33B, one sector is composed of 13×2 frames. A synchronizing code is added to each frame. In the figures, frames are arranged two-dimensionally. On a track, frames are arranged, beginning with the first frame. When the frames are arranged in the order in which the synchronizing codes are arranged in the figures, they are arranged in this order: SY0, SY5, SY1, SY5, SY2, SY5, . . . .

The number of bits in the synchronizing code and that of the data in one frame in the figures are 32 bits and 1456 bits, respectively. Here, 32 bits=16 bits×2 and 1456 bits=16 bits×91. These equations mean that 16-bit modulation codes have been recorded. This is because 8-bit data is modulated into 16-bit data and the 16-bit data is recorded, when data is recorded onto an optical disk. Furthermore, the sector information includes a modulated error correction code.

Figure 34A:
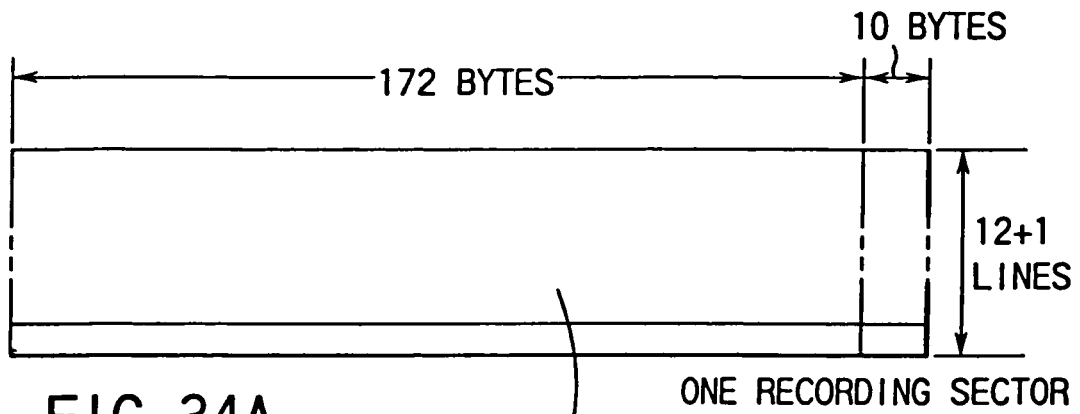
FIGS. 34A and 34B are diagrams to help explain the structure of a recording sector.

FIG. 34A shows one recording sector after 16-bit data in the physical sector has been demodulated into 8-bit data. The amount of data in the recording sector is (172+10) bytes×(12+1) lines. A 10-byte error correction code is added to each line. There is one line of error correction codes. The error correction codes function as error correction codes, in the direction of row, when 12 lines are gathered together. This will be explained later.

Figure 34B:
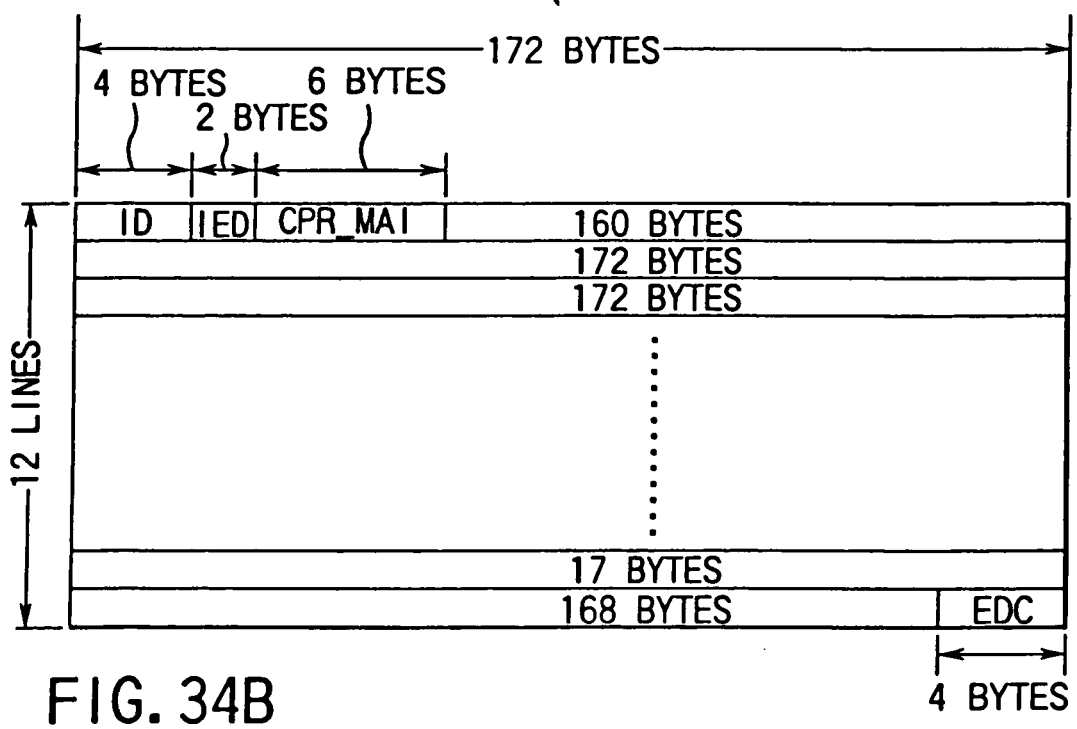

When the error correction code has been removed from the data in one recording sector, the result is a data block as shown in FIG. 34B. Specifically, the data block is such that a 2048-byte main data, a 4-byte sector ID, a 2-byte IC error sensing code IED, and 6-byte copyright management information CPR MAI are added to the beginning of the data and a 4-byte error sensing code EDC is added to the end of the data.

The 2048 bytes of data form a pack as described above. A pack header, a packet header, and audio data are written, starting from the head of the pack. In the pack header and packet header, various pieces of guide information to process audio data are written.

As described above, one packet is allocated to one sector. In the packet, audio samples are arranged. The audio decoder can reproduce the linear PCM data well even from the information in one sector. This is because data is allocated in such a manner that the head of the audio data in one pack always starts at the head of a main sample. This is also because sufficient control information for the audio decoder to process the audio data is written in the pack header and packet header.

Figure 35A:
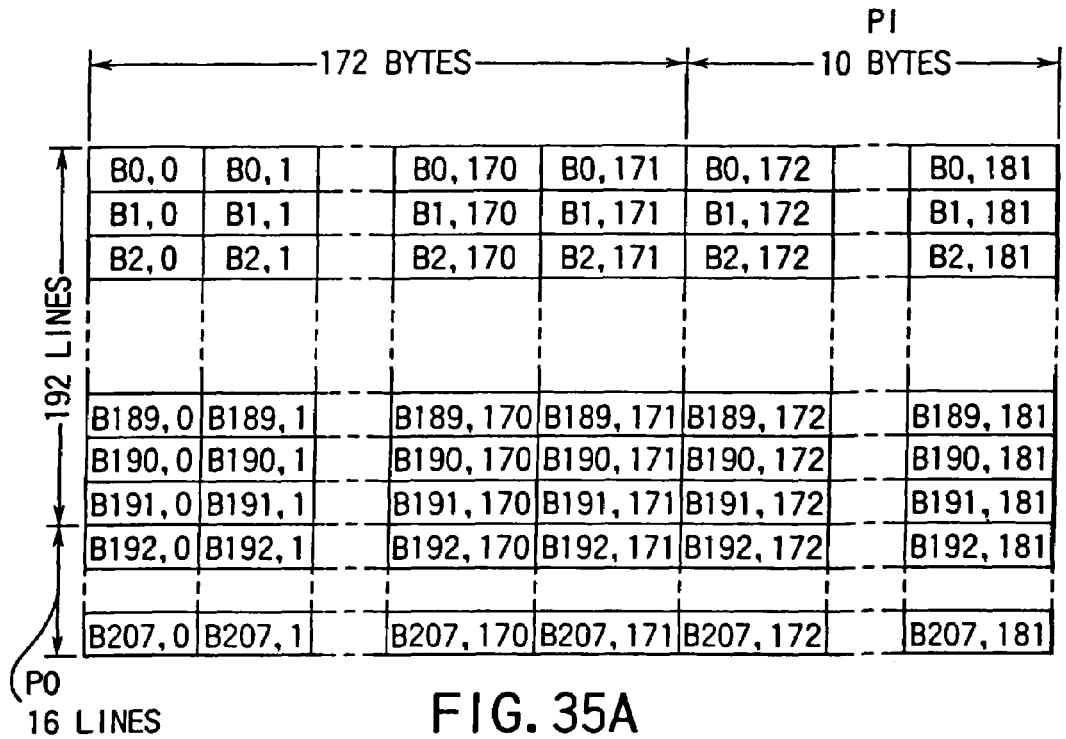
FIGS. 35A and 35B are diagrams to help explain the structure of an error correction code block.
Figure 35B:
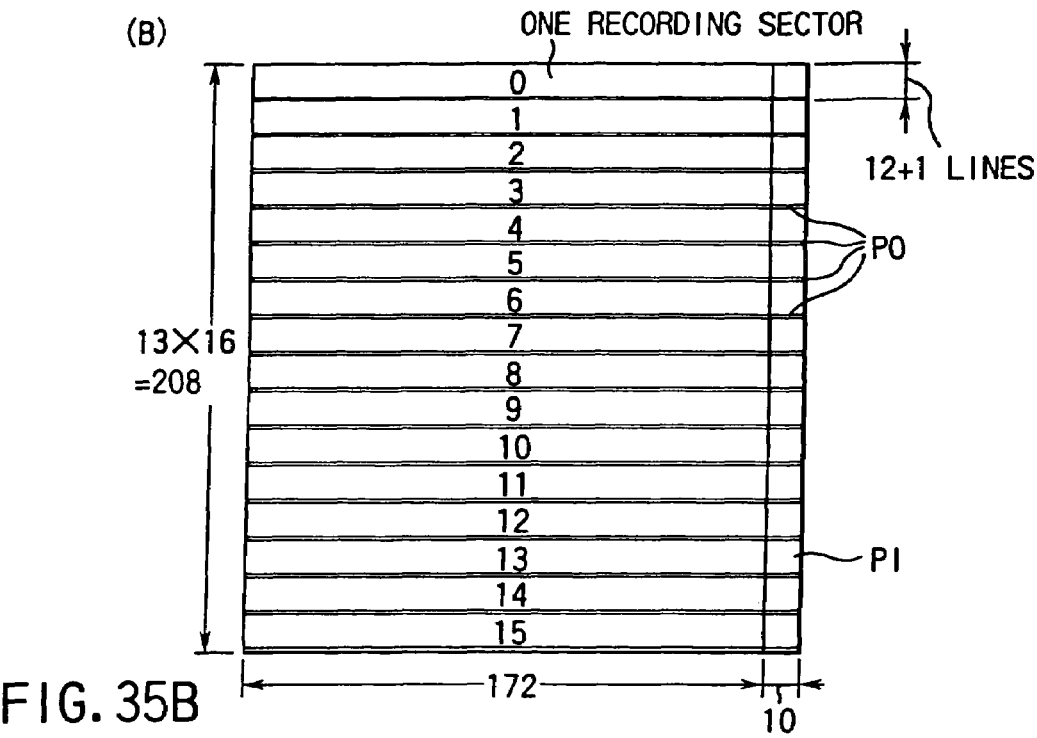

Next, an error correction code block (ECC block) will be explained. As shown in FIGS. 35A and 35B, an ECC block is composed of 16 units of the above-described recording sector. FIG. 35A shows a set of 16 units of a 12 line×127 byte data sector (FIG. 34A).

A 16-byte external code parity (PO) is added to each column. A 10-byte internal code parity (PI) is added to each row. Before the data is recorded, a 16-byte external code parity (PO) is distributed over rows, one bit to one row, as shown in FIG. 35B. As a result, one recording sector is made up of 13 (=12+1) lines of data.

In FIG. 35A, B0, 0, B0, 1, . . . indicate addresses in bytes. In FIG. 35B, each of 0 to 15 assigned to the respective blocks is one recording sector. On the recording tracks of the disk, audio packs, management information, still picture information, if necessary, and real time information are arranged.

In the above explanation, the data structure of the present invention has been recorded on or reproduced from a disk. It is easy to use the data structure in transmitting the data through a communication system. It goes without saying that the present invention may be applied to a data structure itself, an apparatus for transmitting the data structure, an apparatus for transferring the data structure, and an apparatus for receiving the data structure.

While in the embodiment, a method of and apparatus for sampling audio signals and handling the sampled signals have been explained, the present invention may be applied to signals other than audio signals, provided that the data items require playback outputs simultaneously and are used in the same transmitting system or transferring system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An audio information reproducing method for reproducing audio from an optical disk, the optical disk being configured to store an audio object and management information configured to manage the audio object, the audio object including a plurality of packs each containing a packet, each of the plurality of packets having a pack header, a packet header, a private header, and a data section, audio signals of a plurality of channels stored in the plurality of packs being distributed into a first channel group and a second channel group, the audio signals of the first channel group being digitized into a first audio data string at a first sampling frequency in a first number of quantization bits, and the audio signals of the second channel group being digitized into a second audio data string at a second sampling frequency in a second number of quantization bits, the second sampling frequency being different from the first sampling frequency, the first audio data string and the second audio data string being arranged individually, and the management information including an audio title set information management table for reproducing the audio signals of the plurality of channels and a program chain information table, the audio title set information management table including allocation information, which indicates a state of each of the plurality of channels, wherein the state indicates whether each of the plurality of channels is allocated to a stereo channel or a surround channel, and at least one mix down coefficient table, the at least one mix down coefficient table describing a mixing coefficient for mixing each of the plurality of channels when the plurality of channels are reproduced, the packet header describing copyright information and information indicating whether data of the packet is an original or a copy, and the private header including an International Standard Recording Code (ISRC) number used for still picture control and ISRC data, the audio information method comprising:

reading the management information from the optical disk; and reproducing the audio object based on the management information read from the optical disk.

2. An audio information reproducing apparatus configured to reproduce audio from an optical disk, the optical disk being configured to store an audio object and management information configured to manage the audio object, the audio object including a plurality of packs each containing a packet, each of the plurality of packets having a pack header, a packet header, a private header, and a data section, audio signals of a plurality of channels stored in the plurality of packs being distributed into a first channel group and a second channel group, the audio signals of the first channel group being digitized into a first audio data string at a first sampling frequency in a first number of quantization bits, and the audio signals of the second channel group being digitized into a second audio data string at a second sampling frequency in a second number of quantization bits, the second sampling frequency being different from the first sampling frequency, the first audio data string and the second audio data string being arranged individually, and the management information including an audio title set information management table for reproducing the audio signals of the plurality of channels and a program chain information table, the audio title set information management table including allocation information, which indicates a state of each of the plurality of channels, wherein the state indicates whether each of the plurality of channels is allocated to a stereo channel or a surround channel, and at least one mix down coefficient table, the at least one mix down coefficient table describing a mixing coefficient for mixing each of the plurality of channels when the plurality of channels are reproduced, the packet header describing copyright information and information indicating whether data of the packet is an original or a copy, and the private header including an International Standard Recording Code (ISRC) number used for still picture control and ISRC data, the apparatus comprising:

a reading unit configured to read the management information from the optical disk; and a reproducing unit configured to reproduce the audio object based on the management information read from the optical disk.

3. An optical disk configured to store an audio object and management information configured to manage the audio object, the audio object including a plurality of packs each containing a packet, each of the plurality of packs having a pack header, a packet header, a private header, and a data section, audio signals of a plurality of channels, distributed into a first channel group and a second channel group, the audio signals of the first channel group being digitized into a first audio data string at a first sampling frequency in a first number of quantization bits, and the audio signals of the second channel group being digitized into a second audio data string at a second sampling frequency in a second number of quantization bits, the second sampling frequency being different from the first sampling frequency, the first audio data string and the second audio data string being arranged individually, the management information including an audio title set information management table for reproducing the audio signals of the plurality of channels, and a program chain information table, the audio title set information management table including allocation information indicating a state of each of the plurality of channels included in the first channel group and the second channel group, wherein the state indicates whether the channel is allocated to a stereo channel or a surround channel, and at least one mix down coefficient table, the at least one mix down coefficient table describing a mixing coefficient by which each of the plurality of channels is mixed when the plurality of channels are reproduced, the packet header describing copyright information and information indicating whether data of the packet is an original or a copy, and the private header including the packet header describing copyright information and information indicating whether data of the packet is an original or a copy, and the private header including an International Standard Recording Code (ISRC) number used for still picture control and ISRC data.

4. An audio information reproducing method for reproducing audio from an optical disk, the optical disk being configured to store an audio object and management information configured to manage the audio object, the audio object including a plurality of packs each containing a packet, each of the plurality of packs having a pack header, a packet header, a private header, and a data section, audio signals of a plurality of channels, distributed into a first channel group and a second channel group, the audio signals of the first channel group being digitized into a first audio data string at a first sampling frequency in a first number of quantization bits, and the audio signals of the second channel group being digitized into a second audio data string at a second sampling frequency in a second number of quantization bits, the second sampling frequency being different from the first sampling frequency, the first audio data string and the second audio data string being arranged individually, the management information including an audio title set information management table for reproducing the audio signals of the plurality of channels, and a program chain information table, the audio title set information management table including allocation information indicating a state of each of the plurality of channels included in the first channel group and the second channel group, wherein the state indicates whether the channel is allocated to a stereo channel or a surround channel, and at least one mix down coefficient table, the at least on mix down coefficient table describing a mixing coefficient by which each of the plurality of channels is mixed when the plurality of channels are reproduced, the packet header describing copyright information and information indicating whether data of the packet is an original or a copy, and the private header including the packet header describing copyright information and information indicating whether data of the packet is an original or a copy, and the private header including an International Standard Recording Code (ISRC) number used for still picture control and ISRC data, the audio information reproducing method comprising:

reading the management information from the optical disk, and reproducing the audio object based on the management information read from the optical disk.

5. An audio information reproducing apparatus configured to reproduce audio from an optical disk, the optical disk being configured to store an audio object and management information which configured to manage the audio object, the audio object including a plurality of packs each containing a packet, each of the plurality of packs having a pack header, a packet header, a private header, and a data section, audio signals of a plurality of channels, distributed into a first channel group and a second channel group, the audio signals of the first channel group being digitized into a first audio data string at a first sampling frequency in a first number of quantization bits, and the audio signals of the second channel group being digitized into a second audio data string at a second sampling frequency in a second number of quantization bits, the second sampling frequency being different from the first sampling frequency, the first audio data string and the second audio data string being arranged individually, the management information including an audio title set information management table for reproducing the audio signals of the plurality of channels, and a program chain information table, the audio title set information management table including allocation information indicating a state of each of the plurality of channels included in the first channel group and the second channel group, wherein the state indicates whether the channel is allocated to a stereo channel or a surround channel, and at least one mix down coefficient table, the at least one mix down coefficient table describing a mixing coefficient by which each of the plurality of channels is mixed when the plurality of channels are reproduced, the packet header describing copyright information and information indicating whether data of the packet is an original or a copy, and the private header including the packet header describing copyright information and information indicating whether data of the packet is an original or a copy, and the private header including an International Standard Recording Code (ISRC) number used for still picture control and ISRC data, the audio information reproducing apparatus comprising:

a reading unit configured to read the management information from the optical disk; and a reproducing unit configured to reproduce the audio object based on the management information read from the optical disk.

* * * * *